US008123114B2

(12) United States Patent
Chaum

(10) Patent No.: US 8,123,114 B2
(45) Date of Patent: Feb. 28, 2012

(54) HIDDEN-CODE VOTING AND MARKING SYSTEMS

(76) Inventor: David Chaum, Sherman Oaks, CA (US)

( * ) Notice: Subject to any disclaimer, the term of this patent is extended or adjusted under 35 U.S.C. 154(b) by 145 days.

(21) Appl. No.: 12/385,633

(22) Filed: Apr. 14, 2009

(65) Prior Publication Data

US 2009/0308922 A1 Dec. 17, 2009

Related U.S. Application Data

(63) Continuation-in-part of application No. PCT/US2009/001339, filed on Mar. 3, 2009.

(60) Provisional application No. 61/033,179, filed on Mar. 3, 2008, provisional application No. 61/088,046, filed on Aug. 12, 2008.

(51) Int. Cl.
*G06F 11/00* (2006.01)
*G07C 13/00* (2006.01)

(52) U.S. Cl. ........................... 235/51; 235/50 A; 705/12

(58) Field of Classification Search .................. 235/386, 235/51, 50 R, 50 A, 50 B, 54 E; 283/5; 705/12; 434/306

See application file for complete search history.

(56) References Cited

U.S. PATENT DOCUMENTS

| | | | | |
|---|---|---|---|---|
| 6,726,090 | B1 * | 4/2004 | Kargel | 235/51 |
| 7,021,539 | B2 * | 4/2006 | Hurewitz | 235/386 |
| 7,516,891 | B2 * | 4/2009 | Chaum | 235/386 |
| 2001/0034640 | A1 * | 10/2001 | Chaum | 705/12 |
| 2002/0175514 | A1 * | 11/2002 | Warther | 283/5 |
| 2003/0158775 | A1 * | 8/2003 | Chaum | 705/12 |
| 2005/0269406 | A1 * | 12/2005 | Neff | 235/386 |
| 2008/0272194 | A1 * | 11/2008 | Chaum | 235/386 |
| 2008/0281682 | A1 * | 11/2008 | Euchner et al. | 705/12 |

* cited by examiner

*Primary Examiner* — Michael G Lee
*Assistant Examiner* — Suezu Ellis
(74) *Attorney, Agent, or Firm* — Clark & Brody

(57) ABSTRACT

An improved paper ballot voting system allows voters to verify that their ballots are correctly counted and provide substantiating evidence if they are not. Codes are revealed to voters by the act of marking the ballot during voting and voters can check that these codes are posted. If these codes are not posted as marked, voters can make the codes they obtained public. These codes made public by voters can be compared against codes that were cryptographically committed to in advance of the election. If the codes from voters do in fact match codes committed to, evidence of incorrectness of the vote tallying is provided.

2 Claims, 19 Drawing Sheets

HIDDEN-CODE VOTING AND MARKING SYSTEMS

CROSS REFERENCE TO RELATED APPLICATIONS

This application is a continuation-in-part of PCT/US09/01339 filed Mar. 3, 2009 and claims priority from U.S. patent application Ser. No. 11/519,709 filed Sep. 11, 2006 under 35 U.S.C. 120, the US application being incorporated herein in its entirety by reference. The present application also claims priority from two United States Provisional Applications, by the present applicant, titled "ScratchTegrity Voting Systems, USPTO 61/033,179, filed Mar. 3, 2008, and titled "Mark count and unpredictable choice in voting systems," USPTO 61/088,046, filed Aug. 12, 2008. The following are hereby included by reference in their entirety: US patent application entitled "Ballot integrity systems," publication number 2007/0095909, filed May 3, 2007; and US patent application "Scan-Integrity Election Systems," application number 12219034, filed Jul. 15, 2008.

BACKGROUND OF THE INVENTION

Field of the Invention

The present invention relates generally to secure document systems, and more specifically to marking and processing in such systems such as for elections.

The majority of voting systems in the majority of democracies around the world are based on paper ballots that are marked by voters. Lack of confidence among at least some voters in the integrity of vote counting in a number of these elections has, however, diminished voter participation and caused various other significant problems. A way to improve transparency of paper-ballot elections, ideally allowing voters to ensure that their own votes are correctly recorded and that recorded votes are correctly included in the final tally, without diminishing the secrecy of votes or increasing the ease with which voters can be improperly influenced in their voting, would accordingly be advantageous. Related aspects include robust mark recognition, prevention of marks from being added to already cast ballots, receipt printing, check-in procedure transparency, and secure auditing, which would also be advantageous.

Earlier Scantegrity systems, published descriptions of which have been included by reference here in their entirety above, required the voter to fill an oval at a ballot position and optionally to note a symbol such as a letter typically printed next to the oval. An online check by a voter based on an identifying number allowed the voter to verify that the letters that the voter previously noted were in fact posted correctly. A voter could then report any mismatch. If a voter were to report a mismatch in these earlier systems, however, the physical ballot was to be located as part of the solution to resolving the dispute. This step of locating and inspecting an already cast ballot, particularly in the case of false or nuisance reports, is believed undesirable in some settings, owing to such factors as the cost and time involved and potential privacy risk. It is accordingly desired to substantially at least reduce such locating and inspecting of cast ballots.

Earlier systems, such as those described in co-pending applications by the present applicant included herein in their entirety above and in Benjamin Adida's MIT Ph.D thesis titled "Advances in Cryptographic Voting Systems" from 2006, have contemplated the use of scratch-off in various ballot arrangements without addressing this problem.

The present invention aims, accordingly and among other things, to provide secure, privacy-protecting, reliable, and useable election systems and non-election marking systems generally. Objects of the invention also include addressing all the above mentioned as well as generally providing practical, useable, robust, efficient, low-cost systems. All manner of apparatus and methods to achieve any and all of the forgoing are also included among the objects of the present invention.

Other objects, features, and advantages will be more fully appreciated when the present description and appended claims are read in conjunction with the drawing figures.

BRIEF DESCRIPTION OF THE DRAWING FIGURES

Figure 3B:
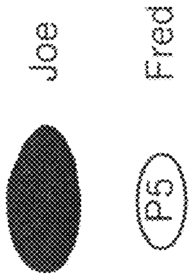
Figure 3A:
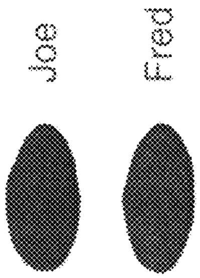

FIGS. 3A-B show plan views of detailed exemplary embodiments of scratch-off ballots in accordance with the teachings of the invention.

Figure 4B:
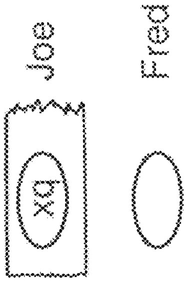
Figure 4A:
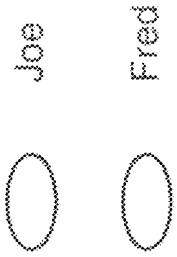

FIGS. 4A-B show plan views of exemplary embodiments of invisible ink ballots in accordance with the teachings of the invention.

FIGS. 5A-D show plan views of exemplary mark position printing in accordance with the teachings of the invention.

FIGS. 6A-D show plan views of de-identifying and de-identified ballots and delayed counterfoils in accordance with the teachings of the invention.

Figure 7A:
Figure 7B:
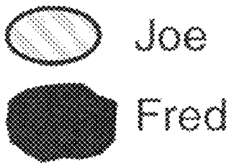
Figure 7C:
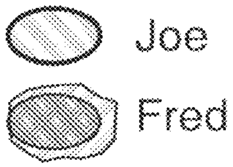

FIGS. 7A-C show detailed exemplary embodiments of pre-filled positions in accordance with the teachings of the invention.

Figure 8:
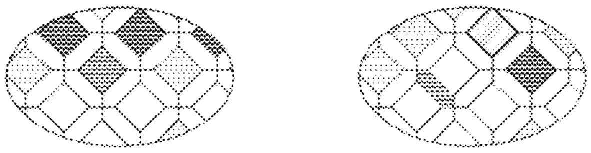

FIG. 8 shows plan views of exemplary embodiment of pre-filled position patterns in accordance with the teachings of the invention.

Figure 9A:
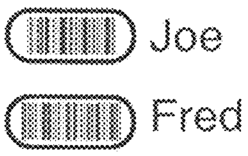
Figure 9B:
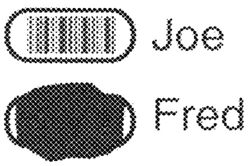
Figure 9C:
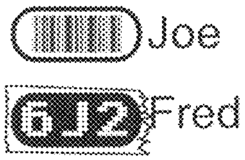

FIGS. 9A-C show plan views of detailed exemplary embodiments of pre-filled coded position forms in accordance with the teachings of the invention.

Figures 10A, 10B, 10C:
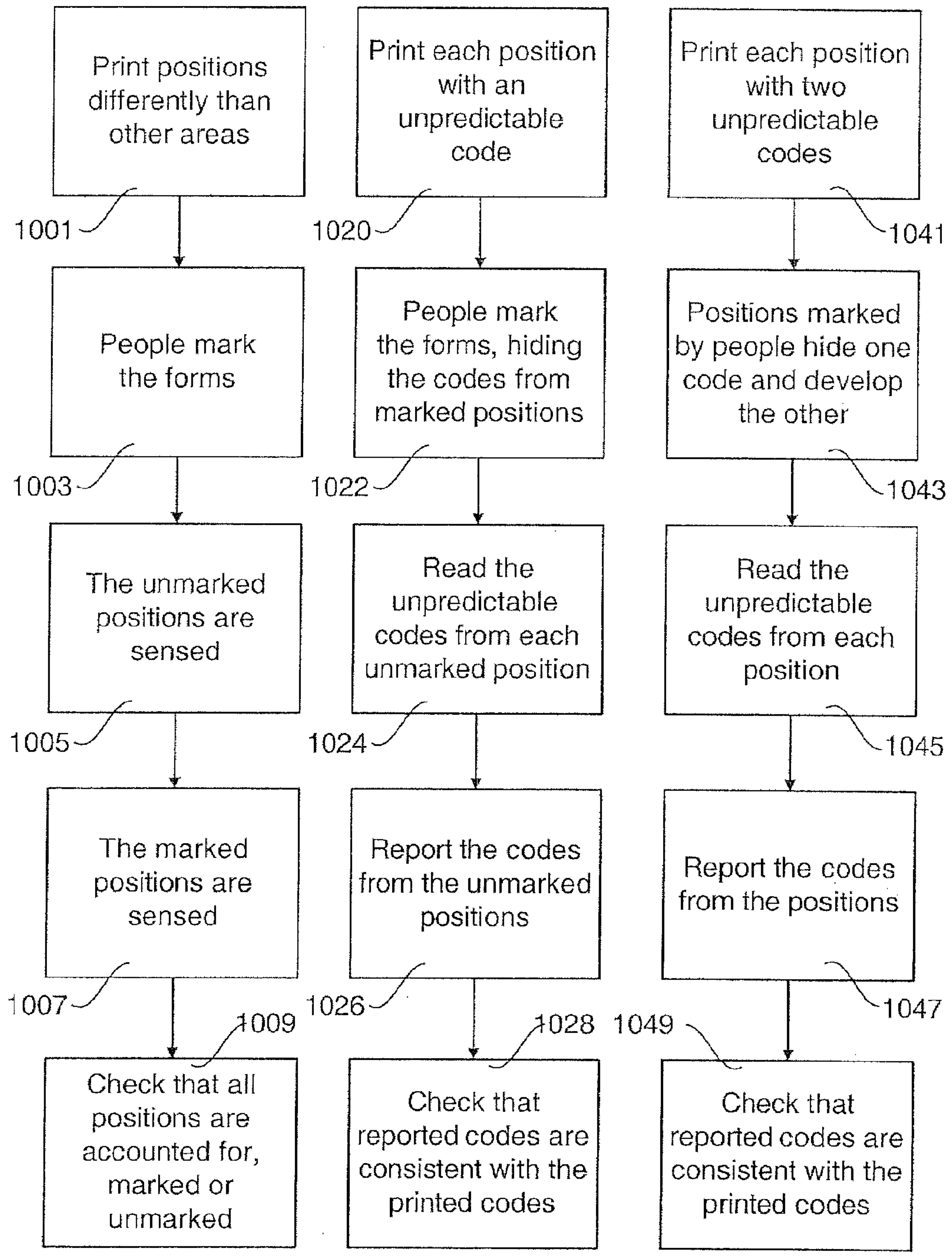

FIGS. 10A-C show combination flowchart and block diagrams of exemplary embodiments of pre-filled positions and related systems in accordance with the teachings of the invention.

FIGS. 11A-D show combination plan and schematic views of an exemplary fade-out invisible ink system in accordance with the teachings of the invention.

FIGS. 12A-D show combination plan and schematic views of exemplary fade-in invisible ink systems in accordance with the teachings of the invention.

Figure 13A:
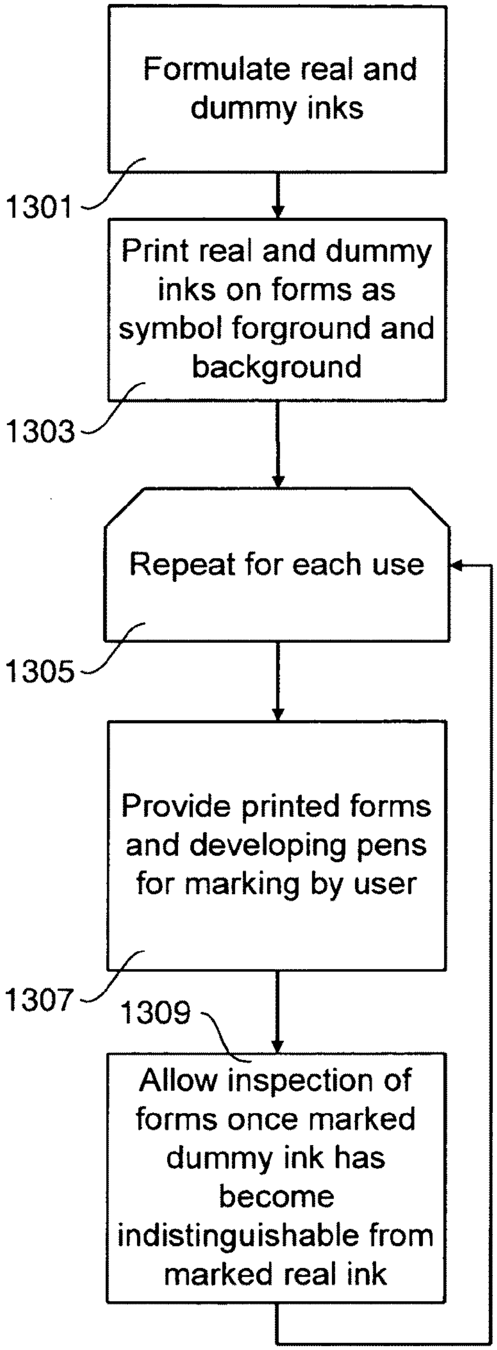
Figure 13B:
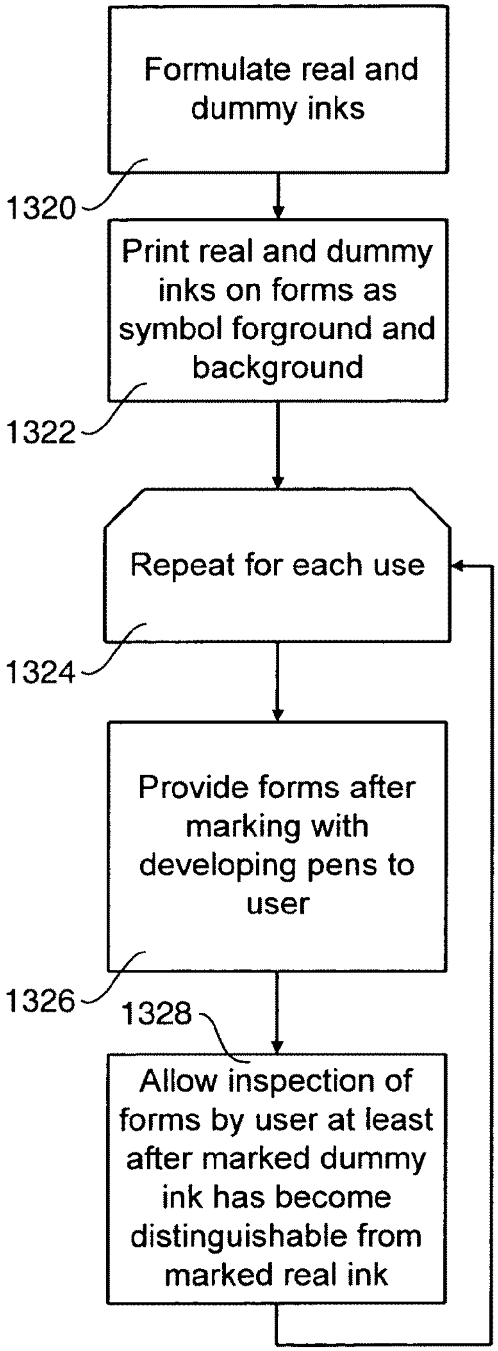

FIGS. 13A-B show combination block and flowchart diagrams of exemplary fading invisible ink systems in accordance with the teachings of the invention.

FIGS. 14A-D show plan views of exemplary embodiments of ballot forms providing mark count contests in accordance with the teachings of the invention.

Figure 15:
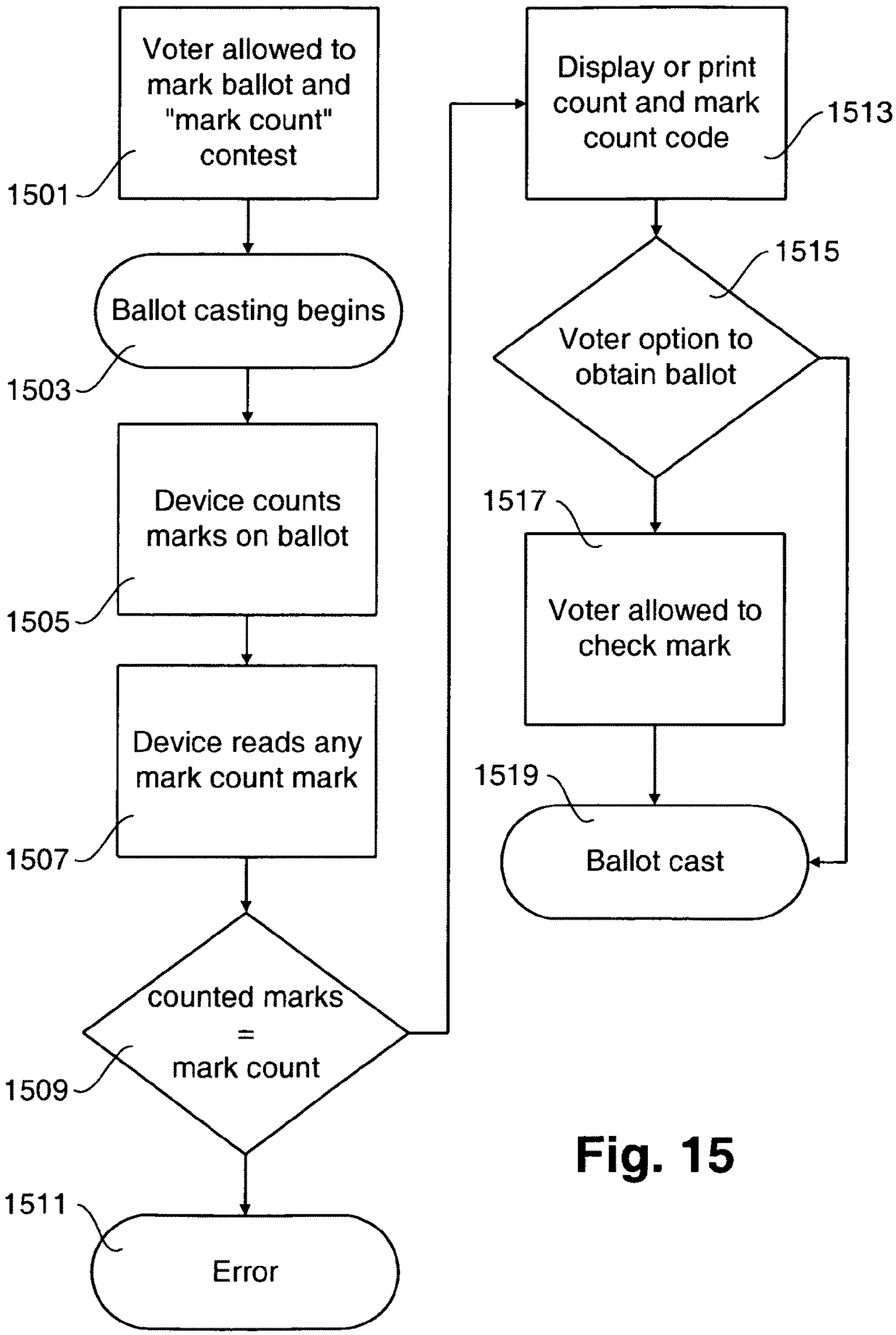

FIG. 15 shows a flowchart of an exemplary embodiment of a mark count code receipting scanner in accordance with the invention.

Figure 16:
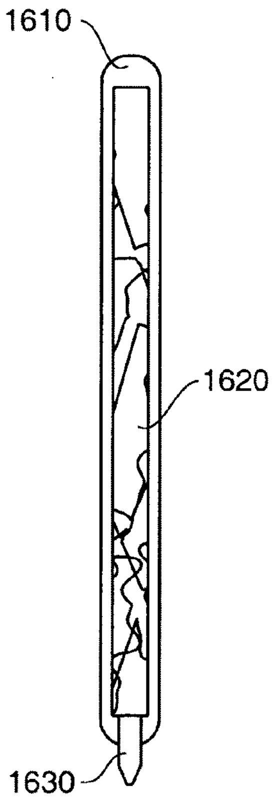

FIG. 16 shows a section of a diversified marking device in accordance with the teachings of the invention.

Figure 17A:
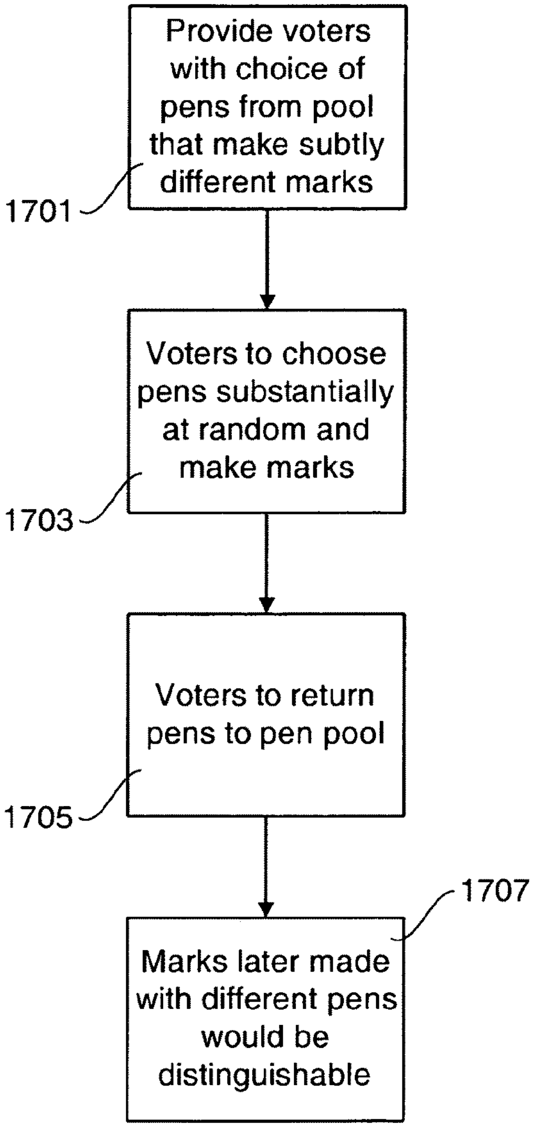
Figure 17B:
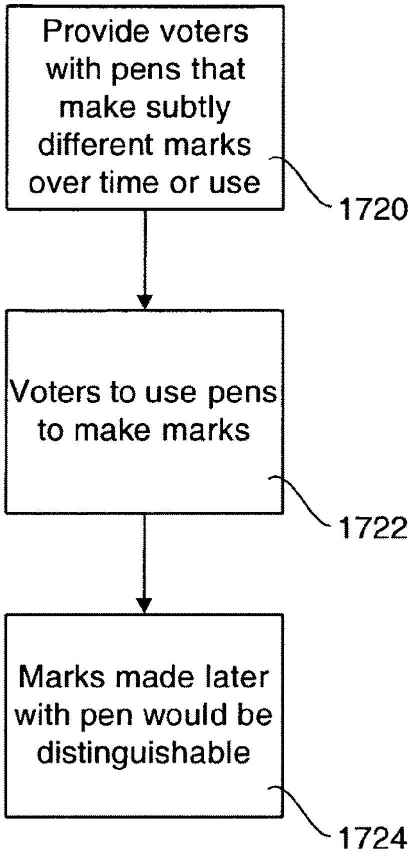

FIGS. 17A-B show combination flowchart and block diagrams of pen diversification systems in accordance with the teachings of the invention.

Figure 18:
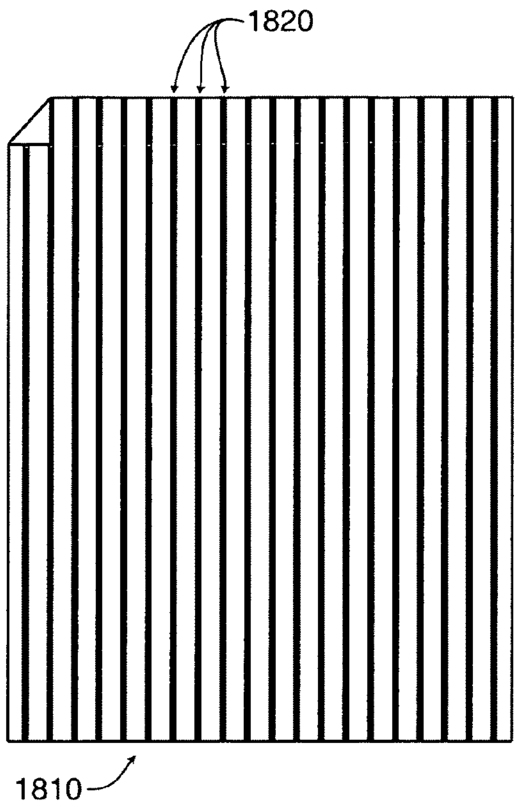

FIG. 18 shows a plan view of an exemplary embodiment of a frozen ballot in accordance with the teachings of the invention.

Figure 19A:
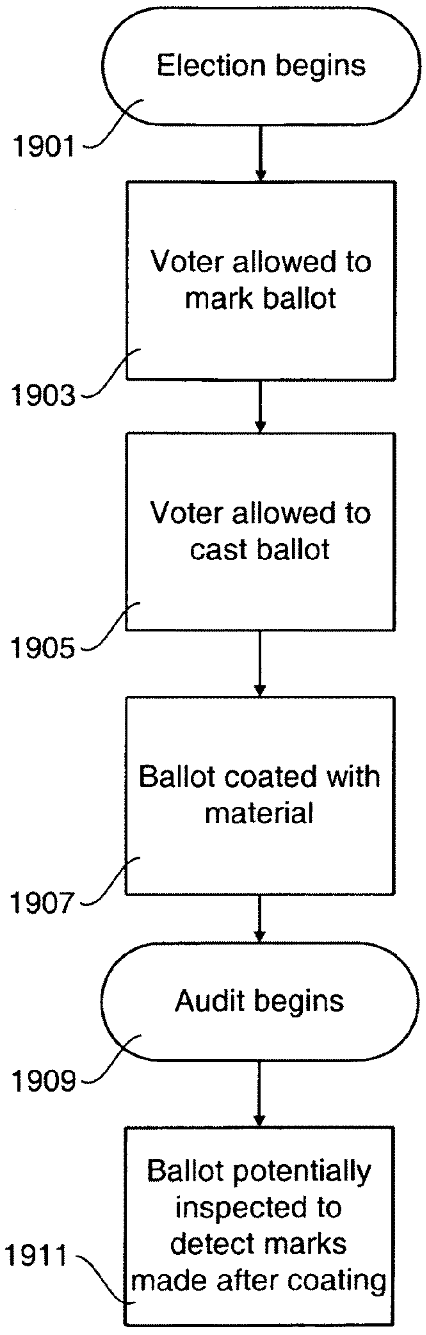
Figure 19B:
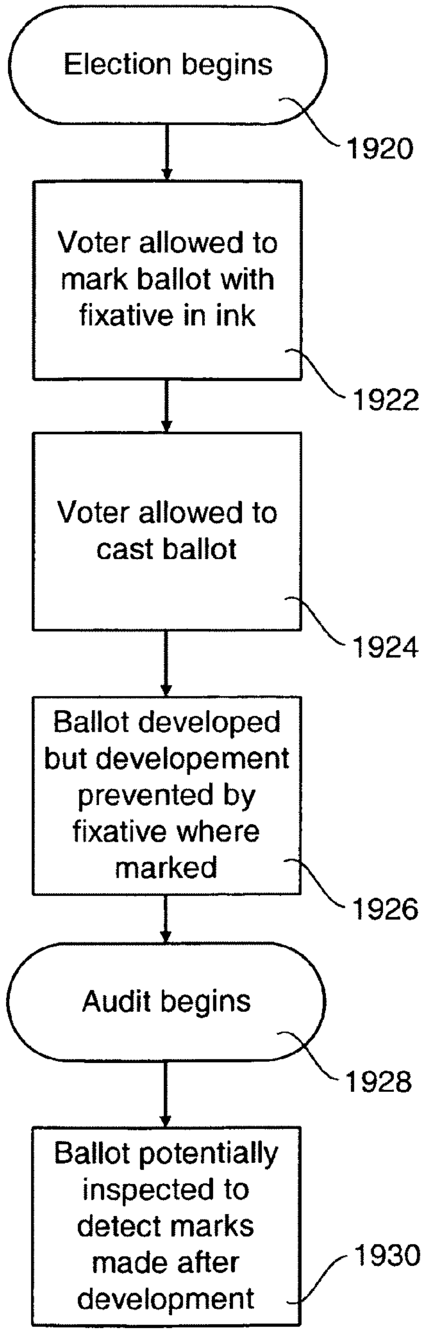

FIGS. 19A-B show combination flowcharts and block diagrams of exemplary embodiments of freezing against undetectable post casting marking in accordance with the teachings of the invention.

Figure 20:
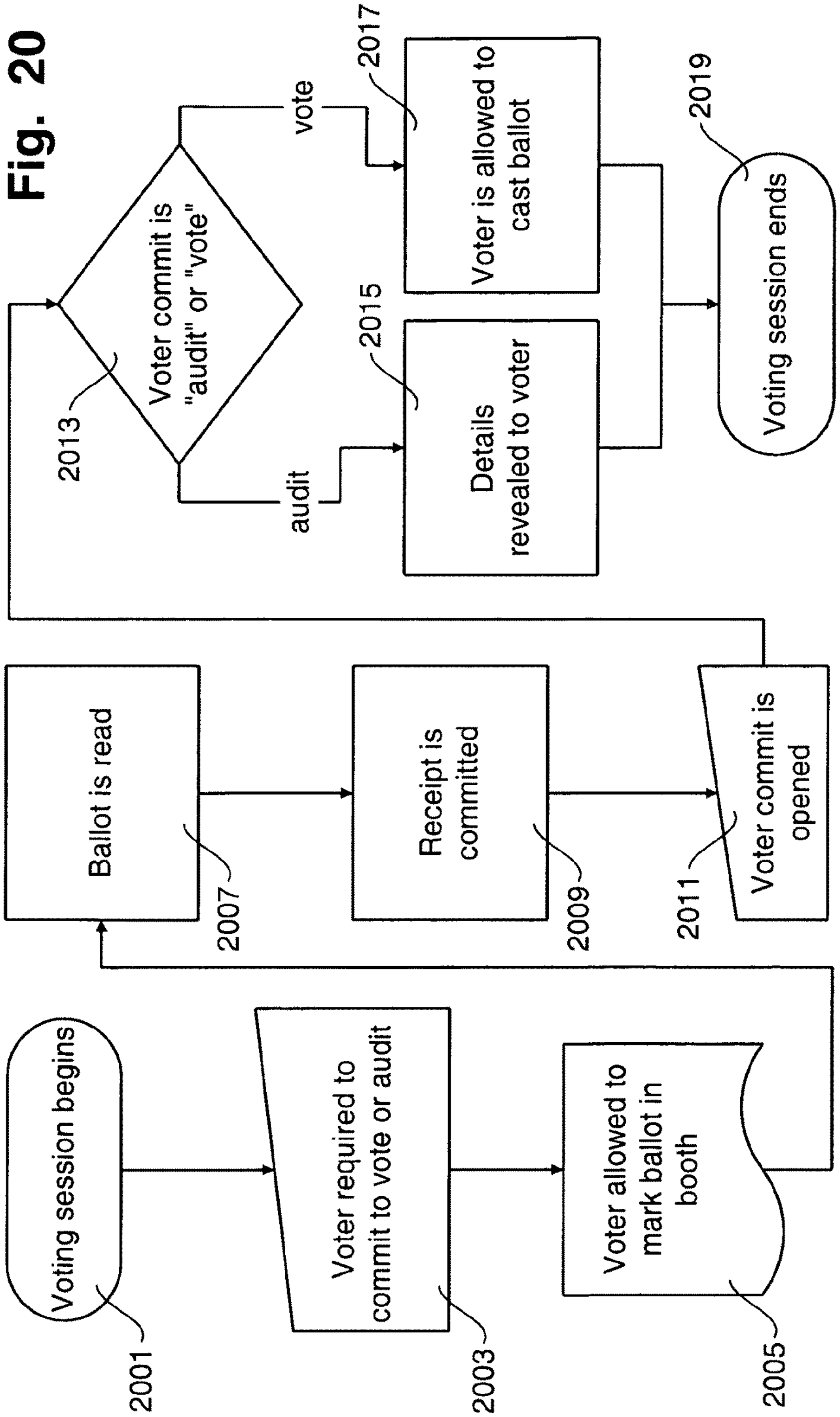

FIG. 20 shows a combination block diagram and flowchart of an exemplary embodiment of an audit choice commit system in accordance with the teachings of the invention.

Figure 21A:
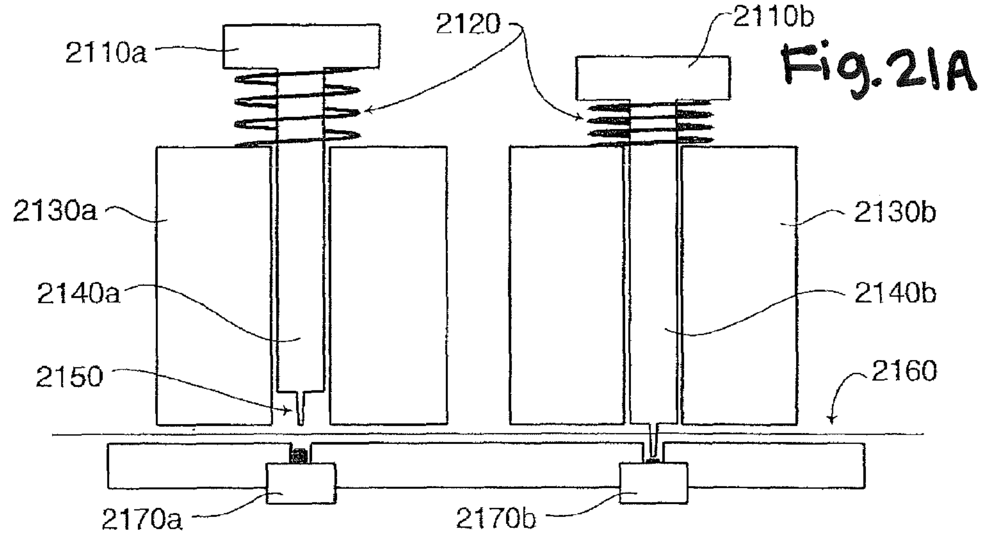
Figure 21B:
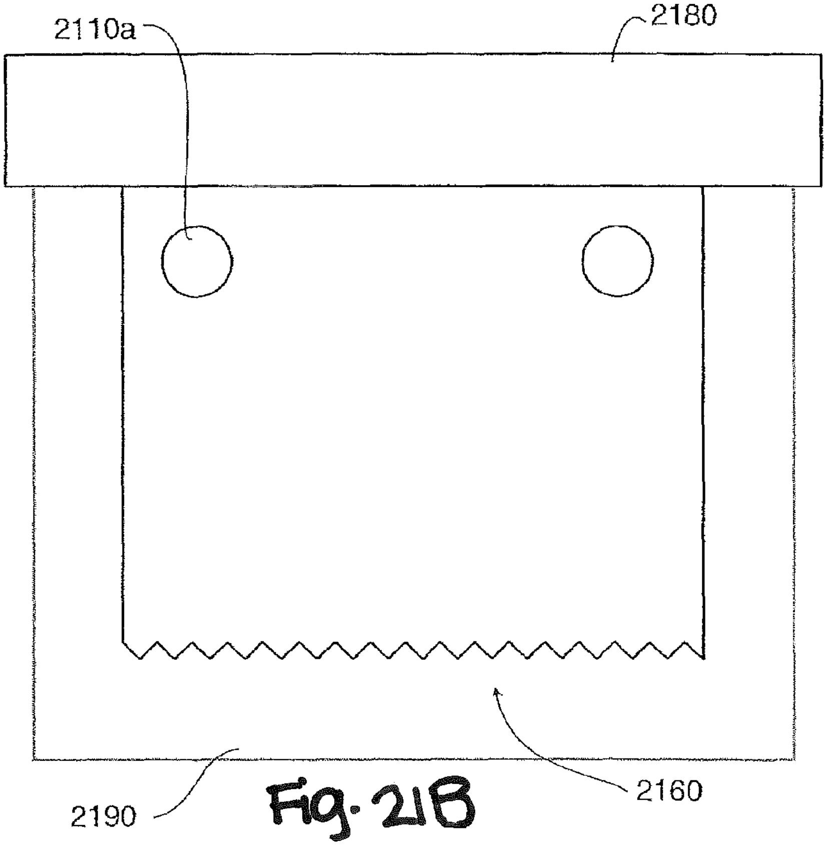

FIG. 21A-B show combination section and schematic views of exemplary embodiments of indelible marking buttons in accordance with the teachings of the invention.

Figure 22:
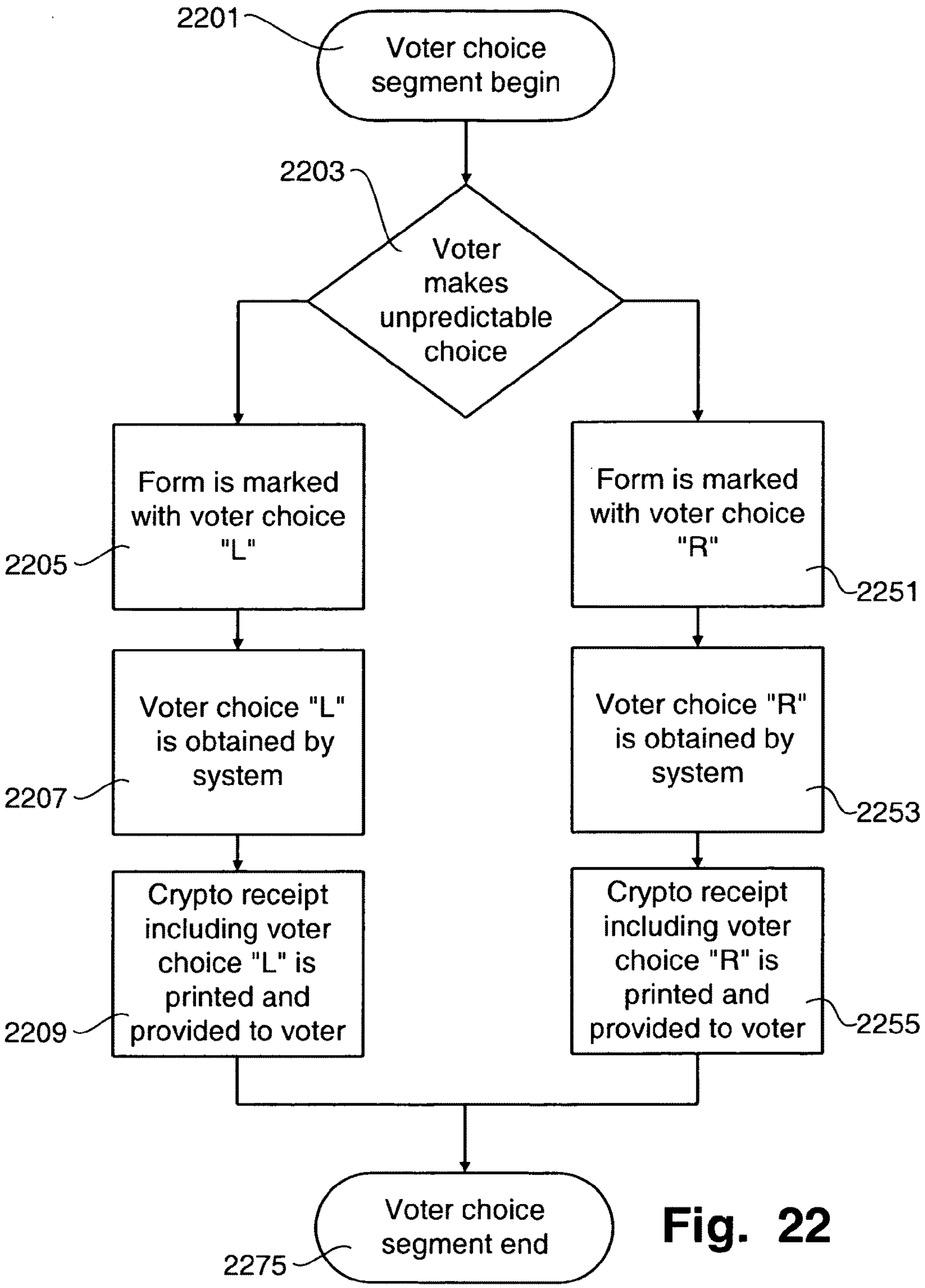

FIG. 22 shows a flowchart of an exemplary embodiment of unpredictable ballot differentiation in accordance with the teachings of the invention.

Figure 23A:
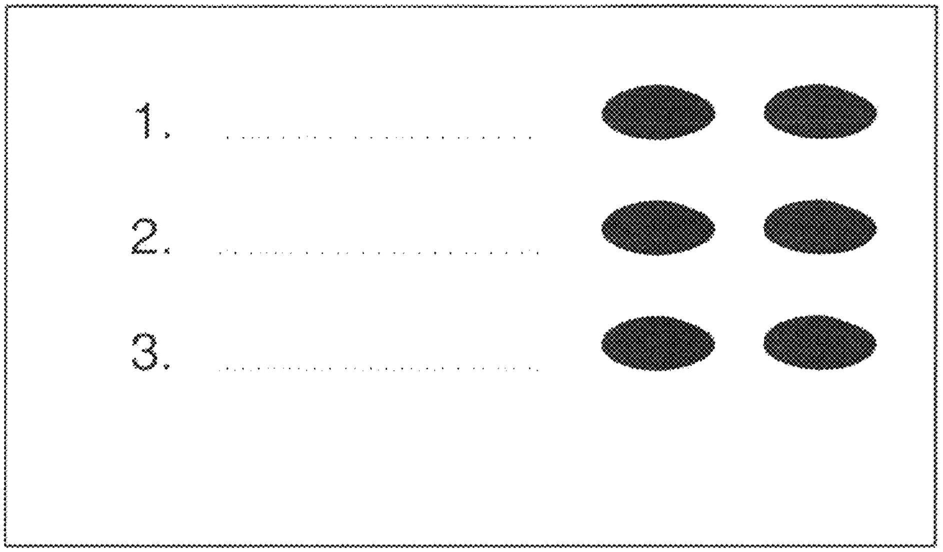
Figure 23B:
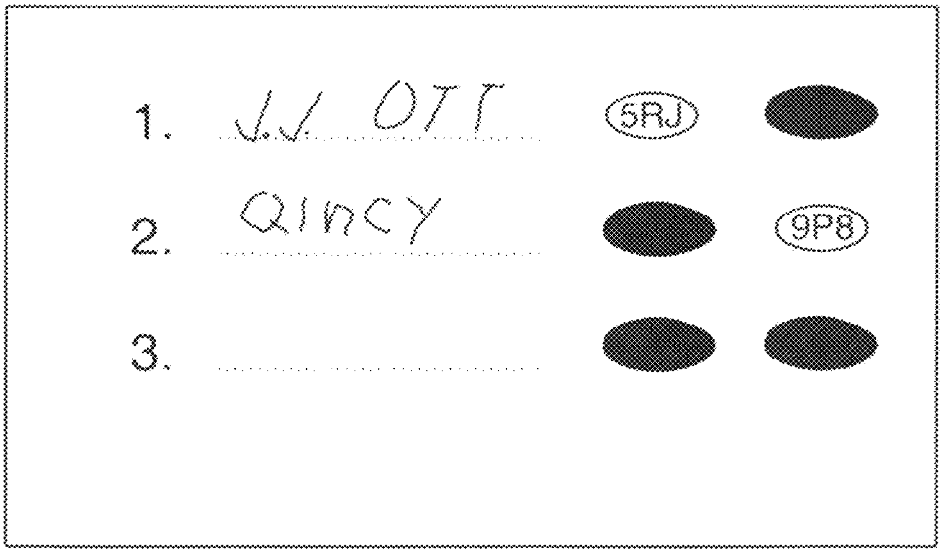

FIGS. 23A-B show plan views of exemplary embodiments of scratch-off paired check-in forms in accordance with the teachings of the invention.

Figure 24A:
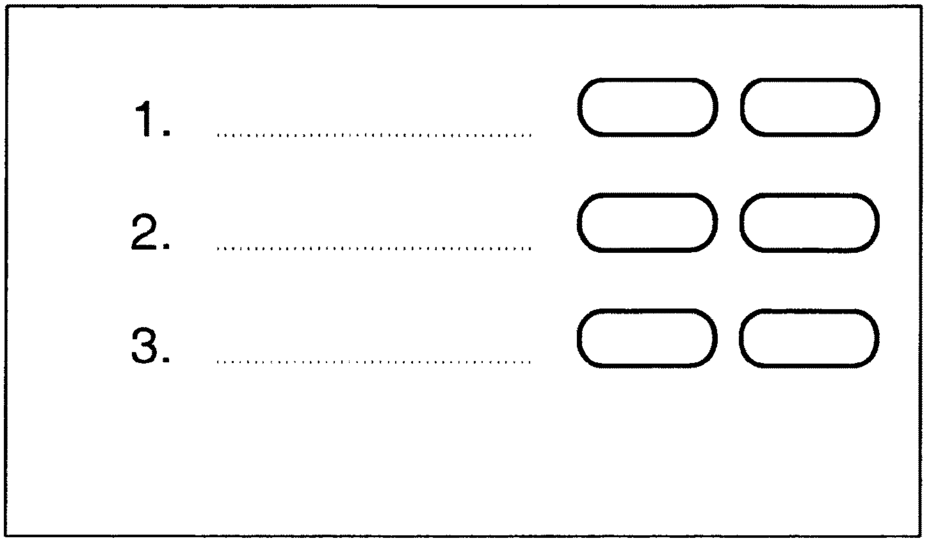
Figure 24B:
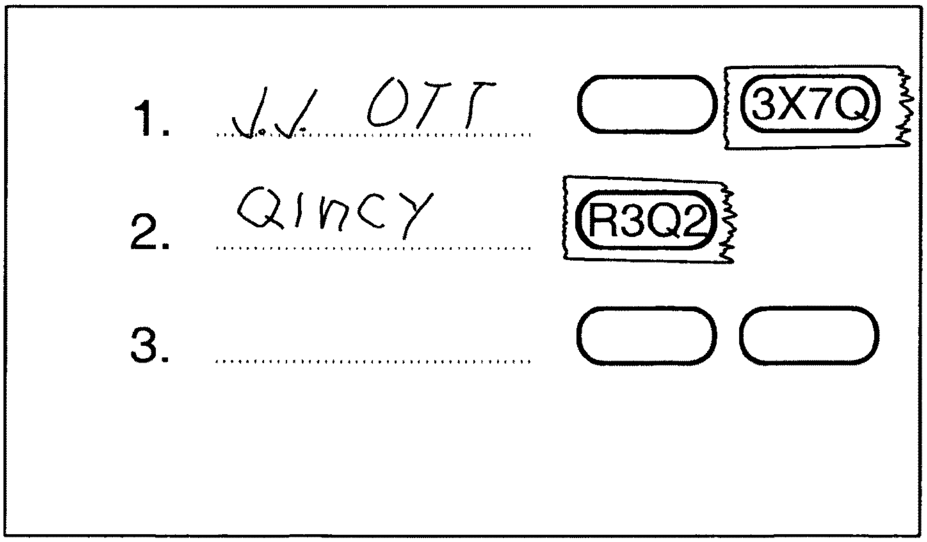

FIGS. 24A-B show plan views of exemplary embodiments of invisible-ink paired check-in forms in accordance with the teachings of the invention.

Figure 25A:
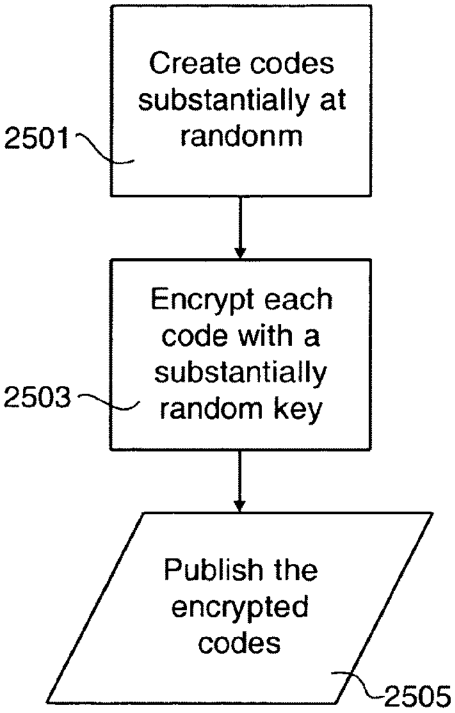
Figure 25B:
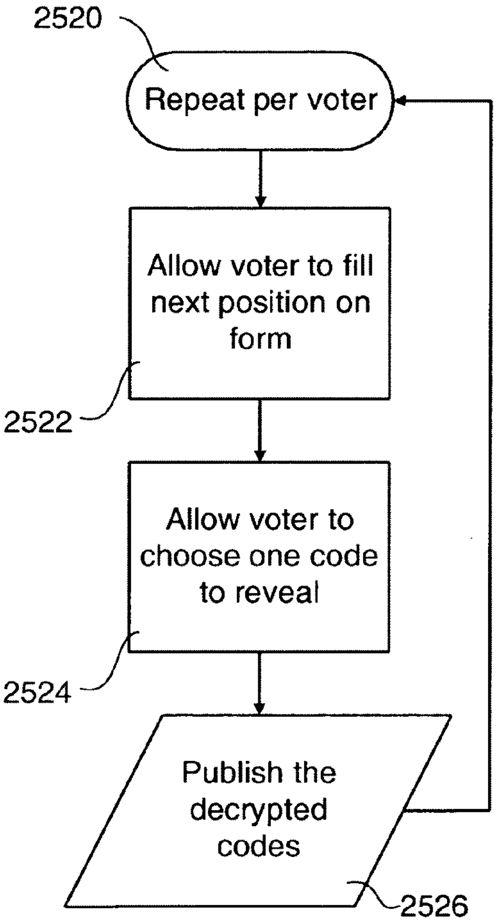

FIGS. 25A-B show combination block-diagram and flowcharts of exemplary embodiments of a voter-verifiable counter system in accordance with the teachings of the invention are shown.

BRIEF SUMMARY OF THE INVENTION

This section introduces some of the inventive concepts in a way that will readily be appreciated, but that may make significant simplifications and omissions for clarity and should accordingly not be taken to limit their scope in any way; the next section presents more detailed descriptions.

A voter "fills the ovals" on a ballot form using a pen that contains a developer ink so that certain "codes" printed in invisible ink on the form in the positions marked are then developed and revealed to the voter. The voter is preferably allowed to note the codes revealed, such as by writing them on paper provided for this. Later the voter may choose to look up the ballot by serial number to see whether the codes were correctly published. If the voter finds that the published codes differ from those noted, then the noted codes serve as an evidentiary basis for the filing of a dispute by the voter.

In advance of the election, cryptographic commitments are published by those running the election that determine but do not reveal the codes and the votes that they will correspond to. After the election those running the election preferably provide what is in effect a so-called "cryptographic proof" that the published codes result in the tally in a way that is consistent with the originally published commitments. All codes for the disputed ballots can be revealed, proving definitively if error complaints by voters are invalid. If enough complaints are not disproved in this way, the election results may be called into question.

Some inventive aspects provide secure, private and reliable printing for use in such elections. By printing invisible inks and dummy inks in patterns that hide coded information, simply being able to detect the presence of ink is not enough to read the hidden information. To protect privacy, information is hidden or revealed with delay after a developer is applied and other information is physically removed from ballots. So that the addition of marks on already cast ballots would be revealed by forensic analysis, the pens used are preferably chosen from sets of different pens or pens that change their marks as they are used or processes are applied to ballots during casting. Also, voters can mark their ballots with counts of votes so that marks added after casting would invalidate the ballot. To allow auditing at the time ballots are cast, voters provide commitments in advance of marking as to whether they wish to audit or vote and printers commit to vote data before voters decide whether to see that data or cast the ballot. By voting a random choice in effect on a special contest, a secure online counter of the number of votes cast is optionally provided.

DETAILED DESCRIPTION OF PREFERRED EMBODIMENTS

Detailed descriptions are presented here sufficient to allow those of skill in the art to use the exemplary preferred embodiments of the inventive concepts.

In one aspect of the present invention, the indicia, referred to here as a "code" or "value," that is printed for each location that can be marked on a paper form or that becomes visible when the position is selected, or what will be referred to generally here as "marked," is preferably chosen from a set, called here a "code set." Such a position will be considered initially "unmarked" until the person "marks" it using what will generally be referred to as a "pen" which will be understood to be any marking means. What will be referred to here as "hidden" codes or values are any that are printed or otherwise formed into the ballot object in such a way that they are not readily learned by a voter without the voter marking them and leaving evidence of so marking. When a voter marks a position, a code corresponding to that position is "revealed" and made at least potentially readable to or otherwise known to a voter. The "mark positions" or simply "positions" on a ballot or other form are here understood to be the locations or regions on the form that can be selected and marked to indicate different choices by the person filling the form. What will here be called "vote choice positions" are positions that correspond to actual votes by voters, such as for candidates or on ballot questions.

A "proffered code," as the term will be used here, is a code value that is claimed to have been seen on a ballot and that differs from that officially posted as what was found on a ballot corresponding to a position marked on the ballot. A proffered code is applicable, or what will be called here "limited," to for example a particular set of ballots and/or contests and more generally a set of positions on ballots called here the "indicia instances." For example, a proffered code may be associated with a particular ballot serial number and a particular contest within that serial number and the relevant indicia instances would then be the indicia printed on that particular ballot under that contest. In another example, a proffered code may correspond to indicia instances that are in a particular contest on all ballots, such as in the case where there are no serial numbers on ballots. In still further examples, a proffered code is limited to indicia instances of ballots cast in a particular precinct. In these examples the code set is preferably associated with the indicia instances and preferably no member of the code set appears printed more than once among the indicia instances.

Accordingly, in a system with sparse code sets that remain hidden until marked, it will be appreciated that an allegation of improper posting related to a particular proffered code is more convincing if that proffered code is revealed prior to the release if any of the indicia instances apart from the subset that are published as marked. As one example, proffered codes are received and posted by a cut-off point and then commitments to the used codes are opened. (The term "commitment" as used herein will be understood to mean the type of cryptgraphic commitment known in the art and as for example described in the included references as well as physical commitments, such as those made by placing a value in an envelope.) As another example, proffered codes are shown to be invalid by a “cryptographic proof” that does not reveal the indicia instances. For those unvoted ballots called here “audited” ballots, the printed codes are optionally released without delay.

Some example scenarios will now be described, as will be appreciated, so as to provide further understanding of the applicability of the inventive concepts. If ballot forms have no serial numbers but do have precinct numbers (limiting them to about a thousand ballots of a dozen or so positions each) and the code set is about seven alphanumeric digits like with airline record locator numbers, and the number of proffered codes is kept to less than a thousand (such as by requiring personal appearance or affidavits), then it is believed that the chance of a guessed code proffered being among the indicia instances is substantially small. As another example, ballots have serial numbers and indicia sets comprise about ten elements, so even a match of a small number of proffered two character codes may it is believed be statistically significant, if the number of proffered codes is kept to at most a few per indicia instance (such as by requiring one of a few candidates, parties or other organization to stand behind unique codes).

The method of a election disclosed can optionally be considered in an aspect as further extended for example to include cryptographic selection of the indicia, printing hidden forms of the indicia on the ballots, revealing the printed indicia by voters in marking, and the dispute resolution procedure requiring the proffered codes to be made known by the voter before commitments to the indicia codes are opened or otherwise used in proof by those running the election. If voters proffer codes not posted but in the corresponding indicia set in substantially many instances and/or against substantially large odds, then a physical audit of the paper ballots is preferably called for and/or the election re-run. Such proffered codes that are not shown to be absent from the code set are here called “evidence” of possible error or malfeasance. The evidence is considered probabilistic in the sense that it could have resulted from chance or guessing on the part of voters; however, when the probabilities are such that there is a substantial statistical confidence for the setting, such as for instance 99 percent, then the values are called “probabilistic evidence.” Counterfoils optionally retained by voters would provide “physical evidence” of substituted forms during an audit.

Figure 1:
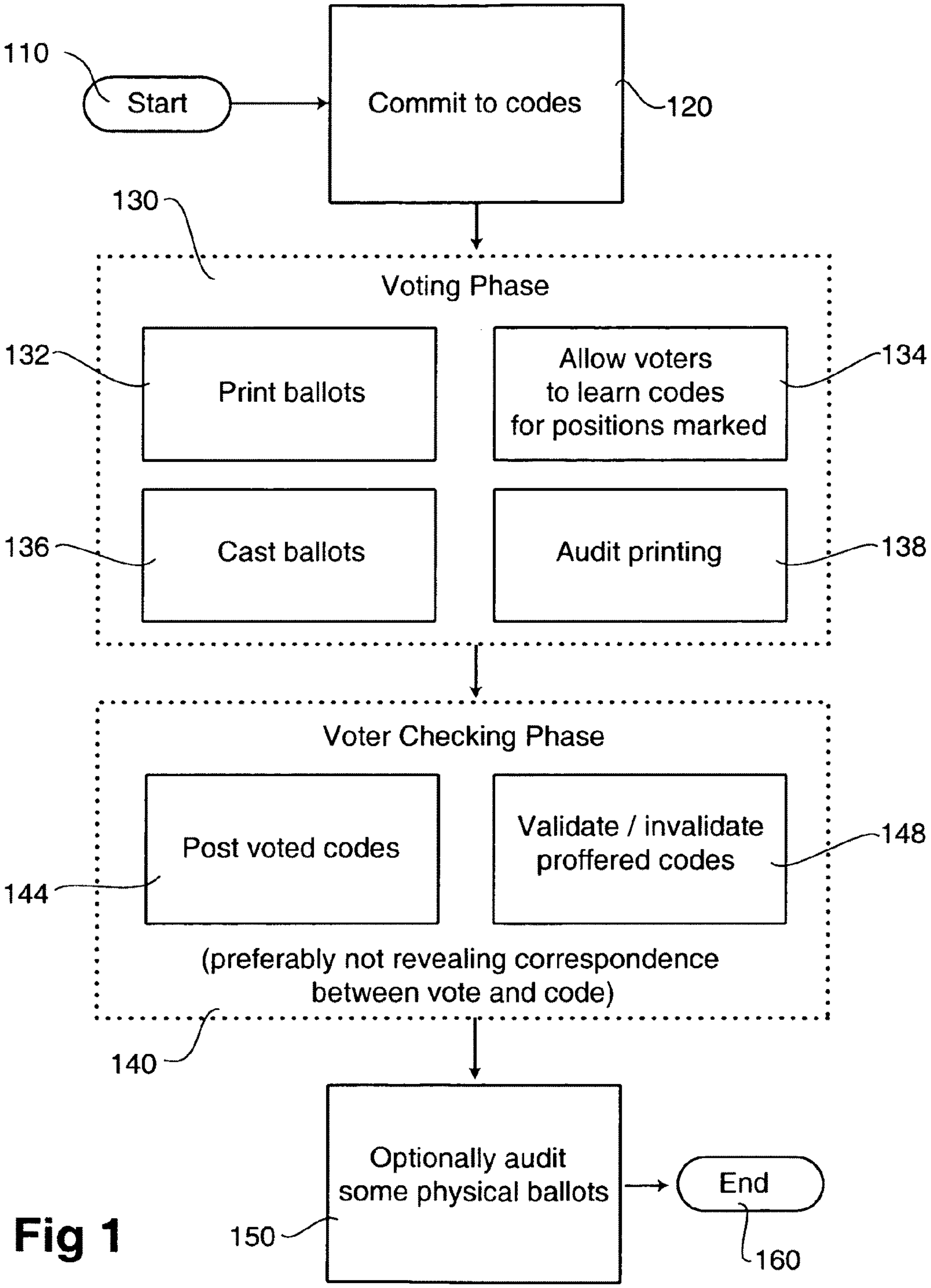
FIG. 1 shows a combination flowchart and cryptographic protocol diagram of an exemplary embodiment of an overall voting system aspect in accordance with the teachings the invention.

Turning now to FIG. 1, a combination flowchart and cryptographic protocol diagram of an exemplary embodiment of an overall voting system aspect in accordance with the teachings the invention is shown. As will be appreciated, a particular exemplary arrangement of possible groupings of steps and their interrelations is shown here for clarity, but without any limitation. Some aspects of so-called cryptographic voting systems known in the art or disclosed in co-pending applications included here by reference are not described for clarity in the description of the present systems but are implicit as would be understood by those of skill in the art. Examples of such aspects include the overall commitment to printing and releasing of results and handling of provisional ballots and audits.

After start 110, the first step indicated in the example arrangement is represented by the “commit to codes” box 120. The codes that voters will see on their ballots for positions that they mark are first determined, preferably at least in a cryptographic and/or random manner so as to be substantially unpredictable (but optionally satisfying certain rules as may be desired such as for usability) and information is published that preferably represents what is generally referred to as a “cryptographic commitment” to the codes. In some examples, such as will be described with reference to FIG. 2, this comprises a kind of encryption of each code, such as using one of the well know “commitment schemes” of the cryptographic art. As will be appreciated, however, there are many ways to “commit” to data and to provide possibilities for selectively “opening” the commitments to reveal and/or demonstrate properties of data content so committed to. In examples where the individual codes themselves are separately committed to and then will be opened later, as will be described with reference to FIG. 2, it is believed advantageous to order or otherwise structure the commitments in a way that does not reveal the candidate corresponding to each. For instance, a randomly ordered vector or set of commitments for a particular contest on a particular ballot can all be opened if desired later without compromising voter privacy but still establishing which codes were valid.

Dashed box 130 depicts a next major phase of the election, that of voting. Various parts of this example grouping are performed in a series or in a more intermingled fashion, depending on the setting. For instance, ballots can all be printed in advance or demand printed for some or all voters. As another example, audit of printing is preferably accomplished immediately at the polling place when the voter obtains a spoilt ballot or it can be performed before the polls open or after they close by voters and/or auditors as will be described later. Accordingly, for clarity an example ordering will be described without any limitation.

Box 132 is the printing of ballots. In some examples this is accomplished by ink-jet printing using multiple inks as will be understood in view of the ballot forms described with reference to FIG. 3 through FIG. 5. All manner of technique for packaging and distributing ballots are known in the election art.

Box 1034 indicates that voters are able to learn codes corresponding to the positions marked. This is accomplished through the use of scratch-off or invisible ink or other techniques, such as including those described in more detail elsewhere here including with reference to FIG. 3 through FIG. 5.

Box 136 is the actual casting of ballots by voters. Until a ballot is cast, voters are generally permitted to “spoil” the ballot and try again, at least up to some limits. Casting differs per voting setting, some of which are described as illustrations: With so-called precinct scan, ballots are scanned at the polling place, affording voters and option to be informed of errors or other aspects of the scanner’s interpretation of their ballot before taking the decision to cast it. In a manual polling place, such as without a scanner, casting may literally be by inserting the form into a box for later hand counting and/or scanning centrally. In a vote by mail system, mailing the ballot may be regarded as casting. For a so-called provisional ballot, the casting can be considered to take place later after the decision to count the particular ballot is made.

To the extent that ballot casting entails scanning of forms, box 136 reflects methods and structure to scan and look for positions marked and/or positions not marked. In particular, the case as described with reference to FIG. 7 through FIG. 10 is anticipated where all positions are to be recognized by the scanning algorithm, whether they are marked or not marked.

Box 138 is the audit of printing. A variety of techniques for this are known in the art. For instance, voters once given a ballot to vote may decide to spoil it and take it home to look up online. The forms that leave the polling place are preferably substantially irreversibly modified (so that they are not readily re-introduced as voted ballots), such as by punching a hole, removing a counterfoil (including removing information yet developed, as will be described with reference to FIG. 6), or tearing from a locked holder. The system should, once a ballot is known to be spoilt, post substantial data related to that ballot, as will be described further with reference to FIG. 2. For example, what is posted preferably includes sufficient data to allow checking that what was supposed to be printed was in fact printed. Other data can be released conveniently, as is known in many systems, that does not compromise other ballots or aspects of the system and allows, for instance, consistency checking of commitments made earlier, such as in box 120 and other commitments as are known in such systems.

Dashed box 140 depicts a further major phase of the election, that of checking by voters. As indicated, this step preferably does not reveal the correspondence between votes and codes, such as would be revealed by a linking between ballot serial numbers and votes. (The votes themselves may be revealed before, during or after this phase, as is known for other cryptographic voting systems and not shown here for clarity.) It is believed that in many settings this phase is at the option of voters to participate in; however, in some settings, intermediaries, such as political parties or other groups may participate and increase the effective level of voter checking. In some example, the information is made public and challenges occur subsequently, and this arrangement is shown for clarity. However, other examples include cooperation between these aspects. For instance, a setting in which codes are not posted initially but rather made available in exchange, such as using a so-called "exchange of secrets" cryptographic protocol, for what the voter believes the codes should be. One example arrangement is described here for clarity.

Box 144 is the posting by those running the election of the codes voted for by voters. One way these codes are obtained, in some example systems, is by scanning the actual ballot and applying so-called OCR or the like to recover the codes visible. Another example, also to be mentioned with reference to FIG. 2, takes the votes associated with a corresponding serial number (or in some examples sets of such numbers) and looks up the codes, such as using secrets that were used in forming the commitments.

Box 148 is the so-called "proof" by the system of whether particular codes proffered by voters would have appeared on ballots. Put differently, the system can debunk many attempts to falsely incriminate it that falsely claim that the codes shown on the ballot differ from those posted. As will be understood, this is by a kind of cryptographic proof or argument that relates to the commitments already mentioned with reference to box 120. Of course, it may happen that some codes were among those that were to be printed and the proffered codes cannot be debunked in this way but may be debunked by physical ballot audit or ignored if they are too few or likely to have been obtained by chance.

Box 150 finally is the manual audit of ballots, the last step shown before the election end 160. As has been mentioned, one believed benefit of the codes remaining hidden for unvoted positions is that it is believed to reduce or eliminate the need for manual audit of particular ballots. When such audit is to be performed, however, it can be. One example is the original scantegrity approach, as is known in the art and disclosed elsewhere. Other approaches are optionally allowed by the hidden codes. For example, a series of holes and a larger hole can be aligned with the ballot in an unpredictable way for each round and the voter allowed to choose one of the holes to open. For instance, the row of holes can align with the codes but be shifted so that opening one hole will reveal a code or some other region of the ballot, such as another contest. In case it is another contest, the additional holes may be opened to substantiate the valid positioning of the holes. The procedure can be repeated any number of times, so that all the codes are revealed with adequate certainty, but which code corresponds to which vote is not revealed.

In some exemplary embodiments manual audit would not be used, at least if there were no statistically significant evidence of substantial malfeasance or sufficient malfeasance to cause changes in the results. One example way to allow shorter codes to still provide substantial resistance to a kind of flooding of many guessed codes per ballot is an "authentication code," such as additional digits printed with the serial number. If the voter feels that the wrong code was posted, the voter can provide the additional digits, preferably through some sort of exchange protocol. For instance, the authentication code along with the proffered code and serial number and contest indication are provided by the voter for a so-called "blind signature" to be formed by those running the election. The type of signature preferably includes the time. Then the values are opened or otherwise shown to be the same or shown to differ from those proposed by the voter through a suitable cryptographic protocol as would be understood by those of skill in the cryptographic art. One example way to prevent cheating by those running the election that provides such authentication codes to block their use by voters is a procedure for providing them, such as in person or in two phases, one of which is online, but the second of which is in person for disputed values. Each phase uses a part of the authentication code.

Figure 2:
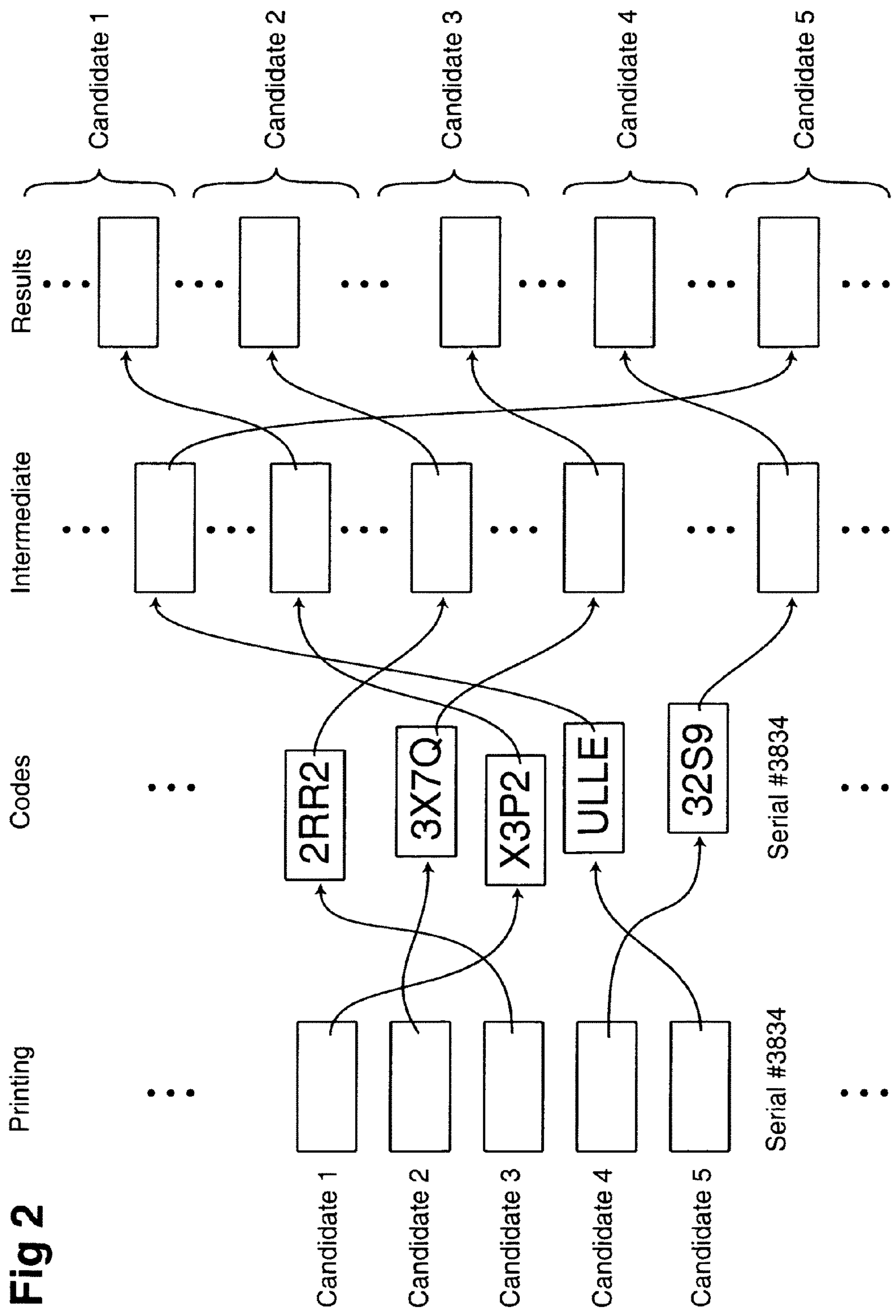
FIG. 2 shows a protocol diagram of an exemplary cryptographic commitment system in accordance with the teachings of the invention.

Turning now to FIG. 2, a protocol diagram of an exemplary cryptographic commitment system is shown in accordance with the teachings of the invention. It presents a very basic example of a particular way to construct the system, for clarity, but without limitation whatsoever, as will be understood by those of skill in the art. The rectangles represent commitments, such as encryptions or the results of so-called "cryptographic commitment schemes." The arrows are in effect pointers or indexes of the elements of the next column that are contained within the commitment of the preceding column. The columns are labeled across the top.

The column labeled "printing" comprises commitments grouped publicly by ballot serial number, as indicated by the example serial number "#" shown. There would of course be many such ballots arranged vertically each with a different serial number, not shown for clarity. The next column is similarly grouped by serial number as shown. The order of the elements is hidden by the preferably substantially random or cryptographic pseudorandom permutation shown by the crossing pattern of the arrows. Inside this column, labeled "codes," are the actual indicia codes that should be printed next to the corresponding candidate of the printing column. Also in each of these elements is a pointer to an element of the next column. The "intermediate" column contains elements optionally not grouped by serial number but ranging over all the serial numbers. The ellipsis and spacing and the permutation of the arrows indicates that these are in a substantially random or unpredictable order, as are the elements of the next table, the "results" columns. This final column is grouped vertically by candidate as labeled.

When a ballot is spoilt and to be opened in audit all the pointers in the leftmost column corresponding to its serial number are first opened. Then the pointers contained are followed, the elements pointed to opened, the pointers followed, the elements opened, the pointers followed, and the final results column elements opened. The codes should be checked to have been printed next to the candidates that they are connected to and each code should be connected to the same candidate in both directions.

When a mark is scanned but the code is not OCR'ed, the code can be found by those running the election following the pointer in the corresponding element in the first column. When the code is OCR'ed those running the election know which commitment contains that element and which commitment in the intermediate and final columns with which it corresponds. In either case the corresponding intermediate element and results element are marked publicly when the results are released. A random challenge, as is known, is then used to select which side of the marked intermediate cells should be opened, forwards or backwards, as is in known systems and/or systems disclosed by the present applicant included here by reference.

If a code is proffered associated with a particular serial number, then all those elements in the second column are opened to reveal the codes used and to show presumably that the proffered code is not a valid code.

Turning now to FIG. 3A-B, plan views of detailed exemplary embodiments of scratch-off ballots in accordance with the teachings of the invention are shown. Referring specifically to FIG. 3A, shown is the contest portion of the ballot before being voted by the voter. Each of the two ovals in the example is hidden by a so-called "scratch-off" coating. To vote for "Fred," the voter scratches off the corresponding latex or other material and the indicia, "P5" in the example, is revealed as shown in FIG. 3B. Each indicia for each ballot instance was preferably selected from a range of substantially all possible such two character indicia preferably by a cryptographic pseudorandom process so that the voter would substantially be unable to guess the code with high-probability. When the ballot is scanned, the absence of the latex is in some examples interpreted as a mark. In other examples the scanner records and OCR's the indicia, such as for double check or for separation of authority or for robustness. Since no special pen is required, this example embodiment may be particularly well suited for vote by mail.

Referring now to FIG. 4A-B, plan views of exemplary embodiments of invisible ink ballots are shown in accordance with the teachings of the invention. Referring specifically to FIG. 4A, shown is the ballot before marking. Not visible, but printed in the ovals are the indicia in invisible ink, as will be described further with reference to FIG. 5. In the example stage of the ballot shown in FIG. 4B, the voter has applied the "developer" agent, such as by a felt-tip marker that has the developer agent as its ink, to develop the mark and make the indicia visible. The color of the developed indicia, shown black for clarity, can differ and be readily detectable by a scanner or camera or the like and can similarly be recognized as distinct from the preferably separately detectable unmarked positions.

In another aspect, voting by those unable to read the ballot is a significant consideration for election systems in many settings. An example solution in accordance with the teachings of the invention is so-called "template" marking schemes used in some jurisdictions. Voters optionally are provided with a special digital camera or scanner that only images an area as big as a mark position. Ideally it would be combined with a marking device so that a single operation would result in the marking and recognizing of the code by the device. Such a device could then provide a verbalization, or other indication accessible to the voter, of the code revealed that the voter could then remember or record by some means such as an audio or memo recorder.

Voting by those unable to mark the ballot is also a consideration for election systems in many settings. A special mechanical device that allows marking of all the positions but does not allow viewing of the marks is anticipated, as can readily be constructed by those of skill in the mechanical art such as by many pens operated by a common lever or a robot arm and camera that marks all positions. The voter preferably witnesses such complete marking, is given exclusive private viewing of the form, utters the codes they wish recorded per contest (including optionally dummies for hidden no votes), and an assistant or automaton records these on a special form, a receipt for which is preferably provided to the voter.

In another example system for voting by voters unable to read the ballot, a pair of recordings is made available to the voter, one of which is chosen by the voter to spoil and to keep for audit. The other audio recording is used by the voter to learn the codes associated with the candidates the voter wishes to voter for. The voter utters the codes and they are marked on a form, a signed receipt for which is preferably provided to the voter. The voter optionally keeps an audio recording of the exchange. The recorded audio heard by the voter is of course not allowed to be kept by the voter and is preferably destroyed.

Prior art scratch-off and related systems do allow the user to see indicia otherwise hidden but not without leaving evidence of which indicia were at least potentially viewed. These systems have disadvantages, including cost of manufacture, bulkiness of articles, difficulty of making large areas/numbers of indicia available for viewing, and production of scrap. An aspect of the present invention allows a mechanism that aims to overcome these shortcomings and is suitable for any application, whether or not related to voting or the like, that realizes the basic functionality: the user can readily see certain indicia but substantially only after leaving evidence of which indicia were seen. Furthermore, certain indicia may become hidden when others are revealed, as may be related to disclosure by the present applicant elsewhere including co-pending applications that are included here by reference in their entirety.

In summary, printing on forms is accomplished in a way designed to protect the codes from being read without leaving marks or at least without leaving forensic evidence. In some examples this includes use of "dummy" inks for regions that are not to develop into parts of indicia and are substantially difficult to distinguish from the "real" invisible ink that is to develop into parts of the indicia. It will be understood that the dummy and real ink in some embodiments are printed in non-overlapping regions but that in other examples they are printed one overlapped over the other. For instance, the dummy may be printed over an entire region and the active "real" ink only in selected portions of that same region. It will also be understood that various chemicals can "block" or "alter" the color of a region and these can be considered as dummy or real inks as well; for instance, a blocking or altering real ink applied to portions of a larger dummy ink region, or as another non-limiting example a blocking or altering ink as real or dummy ink applied to a region with background color. Also various "masking" ink and dye components are aimed at making distinguishing between the invisible ink and the decoy ink more difficult. Furthermore, obscuring patterns such as camouflage are optionally applied to make recognizing unmarked indicia still more difficult. Moreover, the form of the indicia is optionally varied substantially unpredictably to further impede probing or other covert reading.

Referring now to FIG. 5A-D, plan views of exemplary mark position printing in accordance with the teachings of the present invention are shown.

Figure 5A:
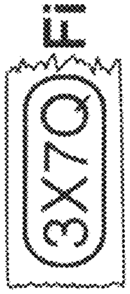

Referring more specifically now to Figure FIG. 5A, the shape of the user-applied ink shown is intended to at least represent an example left-to-right swipe with a marker pen. Stamps, rollers, crayons or whatever other type of marker means are believed to be other suitable examples for depositing chemicals on positions to be marked. Other marking means are anticipated, including applying energy in such as UV light or heat. The indicia will be seen to appear dark on light, but is shown dark on white for clarity. It will be appreciated that light on dark (illustrated with reference to FIG. 5B) has the advantage of a larger and more solid mark for compatibility with existing scanning systems and ease of scanning generally. It will also be appreciated, however, that dark on light without a frame allows indicia to extend closer to the top and bottom of the mark position, such as may be desired where vertical space is limited. Nevertheless, in some examples the developed mark may be larger than the area oval indicia unmarked. The frame around the code in some options is present before and after marking, in other examples it is at least changed by the marking, such as to create a more aesthetic and/or readable marked oval.

Figure 5B:
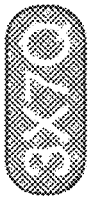

Referring to FIG. 5B an example background printing that is intended to further make recognition of the symbols substantially more difficult is shown in the developed state (for clarity without the marker mark). For instance, some invisible ink reagents do not themselves fluoresce, however, they do block fluorescence that would otherwise be visible on the paper because of such things as so-called whiteners and other components of the paper. Accordingly, the background printing shown preferably appears substantially similar to the symbol printing under various kinds of lighting. Similarly, printing can alter the surface of the paper, such as may be visible as differences in the reflectivity relative to illumination from various oblique angles; however, the tight registration and of the background printing, which preferably substantially similarly alters the surface, is believed to make recognition of the symbols more difficult without marking. The indicia appear substantially light on dark in this example, but are shown as dark on white for clarity.

Figure 5C:
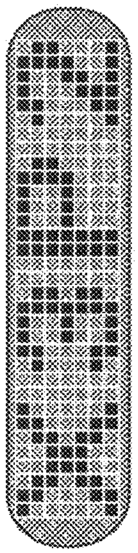

Referring to FIG. 5C, a detailed exemplary embodiment of a pixilated dummy ink and invisible ink position is shown in accordance with the teachings of the invention. The figure shows the position in the developed state (again for clarity without the marker mark); in the undeveloped state the oval is substantially empty with a uniform color of pixels or covered by a camouflage or other pattern as will be described (with reference to FIG. 5D). The indicia "X3P2" is shown in a bitmap type of font with optional thin separation lines between the pixels forming a grid. The indicia are in the real invisible ink and the background in the dummy ink, or the other way around. The example shows the indicia darker (black for clarity) than the dummy when developed, but in some applications for compatibility with existing scanners and for other reasons the background may be darker than the indicia or whatever two colors may be used. Whatever masking or camouflage in some embodiments is at the pixel level, so that there may be many different "colors" of pixel in the undeveloped image. So that precise alignment of the pixels does not betray their type, slight randomization of positioning of pixels is also anticipated as an option. As another example, a two-dimensional barcode as mentioned with reference to FIG. 9 may be incorporated pixel by pixel or using four adjacent pixels and so forth.

Figure 5D:
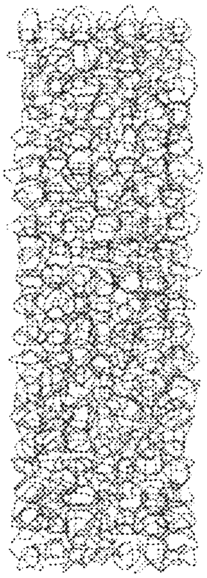

Referring finally to FIG. 5D, a detailed exemplary embodiment of a super position camouflage ink pattern is shown in accordance with the teachings of the invention. Various regions are shown in substantially irregular shape and each potentially is filled with a different masking color or combination of colors, whether visible and/or fluorescent and/or UV or IR. As mentioned, such camouflage is preferably of the disappearing or non-visible types of inks and can be printed below, intermingled with, and/or above the dummy and real ink or the real invisible ink. These techniques can be combined with those already described with reference to FIG. 5C for camouflage at the pixel level, as will be understood.

A variety of ways to make, print and develop so-called invisible ink (also variously called for instance latent ink, sympathetic ink, or concealed image ink) are well known. Such ink systems including pre-printed ink and a developing marker means have been used in applications related to education and amusements for children. Some example prior art includes U.S. Pat. No. 7,111,933, "Ink-jet systems and methods using visible and invisible ink"; U.S. Pat. No. 6,672,718, "Aqueous latent image printing method and aqueous latent image printing ink for use therewith"; U.S. Pat. No. 4,525, 214, "Crayon adapted for development of latent images"; U.S. Pat. No. 5,935,308, "Latent image jet inks"; and U.S. Pat. No. 5,443,629, "Latent image ink," all incorporated herein by reference.

In another aspect, it may be feasible to read the indicia without leaving a trace. For example, simply printing invisible ink as mentioned will typically alter the surface of the paper stock, such as due to wetting, and this may be detected and read in some cases as simply as using glancing illumination. Another example mentioned is that an invisible ink may, even if it does not fluoresce itself, block the transmission of fluorescence from the paper. The present invention aims to overcome such deficiencies and is thus applicable to a wide range of applications where hidden indicia are used, whether or not they relate to elections or the like. It overcomes such deficiencies in some examples and at least in part by application of what have here been called "dummy" inks. A dummy ink is preferably printed so as to make reading the hidden indicia substantially equivalent to distinguishing dummy ink from "real" invisible ink. For instance, a region is divided into sub-regions such as so-called "pixels" and indicia is comprised of a collection of pixels being printed with real invisible ink and the remaining pixels being printed with dummy ink, as in FIG. 5C. When developed, the invisible ink turns a color and the dummy ink is a different color or no color. Examples of dummy ink include ordinary ink non-changing ink of the desired color and so forth.

Another inventive technique for obscuring symbols printed is by use of "masking" dye as in FIG. 5D. In some examples dye that fluoresces, such as in the IR, visible, or UV, is added to both the dummy and real invisible ink to overwhelm any fluorescence difference that they may have or any difference that they may cause in the fluorescence of the paper through the ink. In some examples dye is printed under, with, and/or over both the dummy and the real invisible ink, either uniformly or in patterns. Patterns are known for obscuring readability of text, and such patterns are examples of patterns in which dye may be printed for this purpose. More than one set of patterns overlapping each with one or more dye is anticipated. Disappearing dye may also be used to obscure indicia, such that when the area is developed by the special pen the disappearing dye becomes substantially less obscuring and allows reading of the indicia and/or indicia readable due to the disappearing dye becomes unreadable.

A still further inventive technique for obscuring symbols includes randomization related to the a symbols themselves. The form of the indicia is optionally varied substantially unpredictably to further impede probing or other covert reading. For instance, the position of symbols within the oval or other region is preferably varied substantially or fully randomly. Another technique is to change the "font" or way the symbol is rendered, such as including distortion or the like. Further examples include so-called CAPTCHA techniques and puzzles and the like that encode a symbol in a way that requires some intelligence or thought to decode.

One issue with paper ballot voting systems where serial numbers on ballots are desirable, such as where required by law or for voters to use in online checking of coded-vote receipts, is that poll workers might be able to readily learn which voters are issued which numbers. A second issue is present in some settings, however, where the paper record should not include linking information and it is desirable to remove the identifying information from ballots after they are captured electronically. A third issue, which occurs for instance in so-called "scantegrity" style voting systems, whether invisible ink is used or not, is that ballots may be identified by the particular codes voted and this is undesirable in certain settings. All three issues might facilitate certain so-called "improper influence" schemes, particularly in case the ballots are to be hand-counted at a local level.

The second issue, where it is an issue, can be dealt with at least in some settings by modifying the ballots after they have been cast, as will be described with reference to FIG. 6. The first and third issues will be addressed later by use of special ink systems, to be described with reference to FIGS. 10 through 13.

The term "identifying" as used here in some examples relates to the identity of a document or record or other non-human entity. The term "de-indentify" will be used here for any method or means that removes identifying information and/or makes such identifying information inaccessible or hidden or unlinked. An object will be said to be "disassociated" with an informational or physical entity if the two are not readily linked.

Figure 6A:
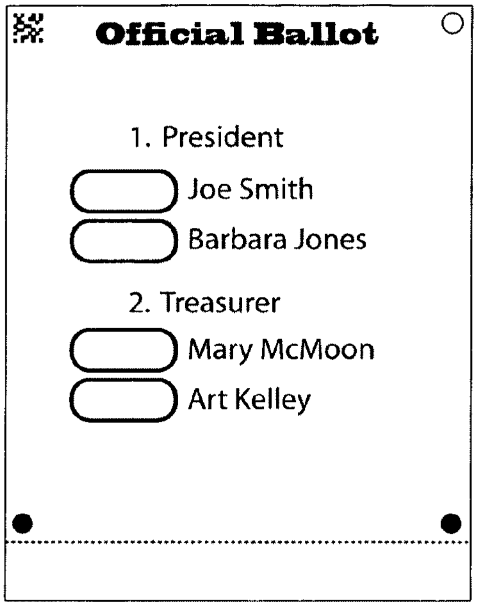
Figure 6B:
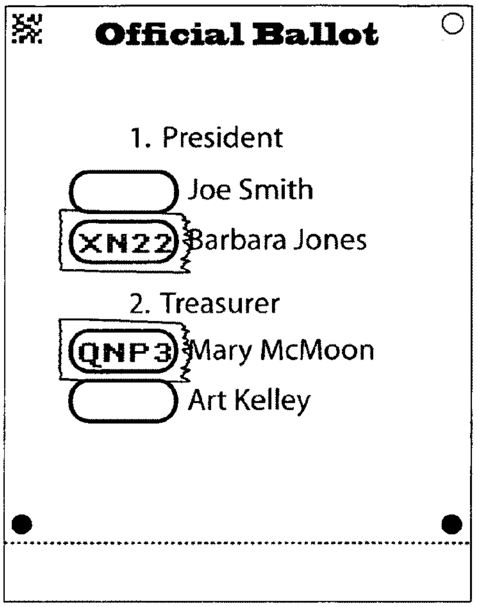
Figure 6C:
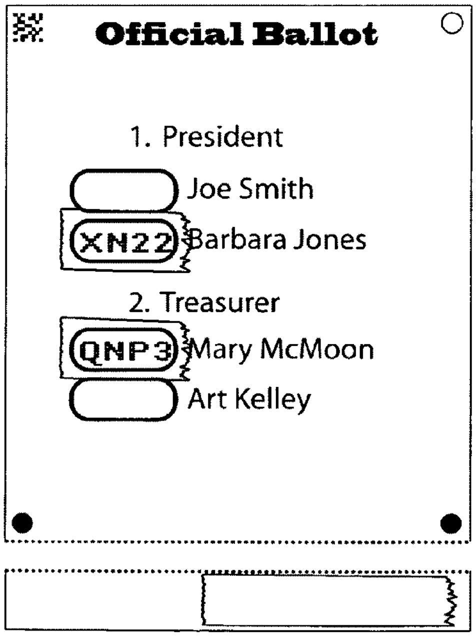
Figure 6D:
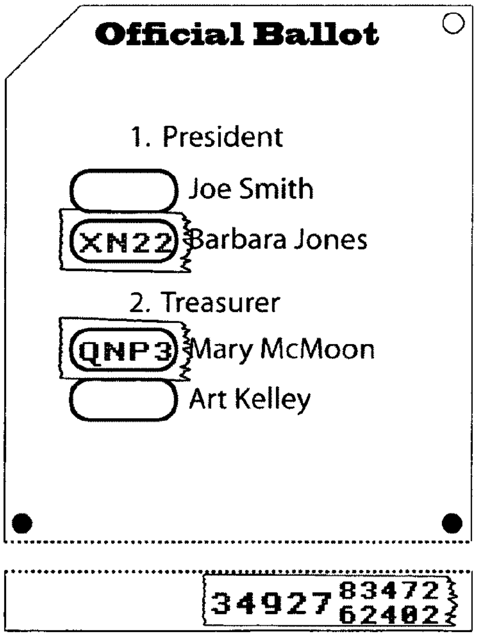

Turning now to FIG. 6A-D, plan views of de-identifying and de-identified ballots and delayed counterfoils in accordance with the teachings of the present invention are shown. Four views are provided illustrating stages of the ballot: FIG. 6A, unvoted; FIG. 6B, partly marked by voter; FIG. 6C, marked by voter and counterfoil separated and marked by poll-worker; and FIG. 6D, ballot de-identified and counterfoil developed. The ink system used by voters to mark the ballot and reveal the codes corresponding to the positions marked eventually changes to hide the codes, as seen in FIG. 6D. Also, the codes on the counterfoil are marked in FIG. 6C, but only develop later as shown in FIG. 6D. Part of the form is removed to de-identify it in FIG. 6D.

More specifically, referring now to FIG. 6A, the unvoted ballot form is shown. Included, as will be seen, are two plurality contests as examples, each with jelly-bean-shaped areas to fill. Any pre-fill, to be described with reference to FIGS. 7 through 10, is not shown for clarity. An optional perforation line or the like shown across the bottom allows for the convenient separation of the counterfoil chit that will be provided to the voter after the voter has cast the ballot and to be described in more detail with reference to FIGS. 6C and 6D. The upper left corner of the form contains a 2-d barcode, as an example of data identifying the ballot serial number that is preferably not readily recognizable and read by a poll-worker. The upper right corner has a hole drilled in it, to allow locking to a clipboard for prevention of so-called "chain voting" and the like. Two solid black circles are printed on the lower corners of the form (above the perforation) that are intended to serve as examples of alignment marks, if used.

Referring to FIG. 6B, the state of the form is substantially the same as already described with reference to FIG. 6A, except that the voter has marked one position in the first contest. This marking preferably takes place in a booth.

Referring now to FIG. 6C, the voter has completed marking the form and the counterfoil has been detached and activated by the application of developer. This is the state of the ballot after the voter has finished marking in the booth and provided the ballot for scanning or inclusion in the ballot box and the ballot has been successfully scanned or cast and the counterfoil removed and the developer applied to it. The voter takes the counterfoil home and the ballot is in the ballot box.

In other example embodiments, not shown for clarity, the counterfoil is printed on by a printer at the time of ballot casting. In one such example a so-called "public key digitial signature" or other suitable authenticator is included on the counterfoil at that time. The values so authenticated include, but are not limited to, the so-called "serial number" of the ballot that the voter can use to check on the recording of the codes or that is printed on the forms so that the voter can learn it; the codes voted by the voter; and/or a timestamp. Such printing can be in human readable form and/or machine readable form such as barcodes. In some examples the printed receipt is provided on a separate piece of paper. It is believed that a such a printed receipt can obviate the need for a counterfoil in some settings and threat models. In some examples the receipt is shown to the voter all or partly "under glass" before the ballot is cast.

Referring finally to FIG. 6D, physical de-identifying as well as two aspects of the time delay in the ink system are shown. The upper left corner of the ballot form, which had the barcode identifier printed on it as earlier described with reference to FIG. 6A, is now shown as trimmed off. In some examples, not shown for clarity, a paper drill may be used instead of a paper cutter and in some examples all four corners or a center portion are removed to avoid the need to orient all the forms the same way. The codes revealed to the voter during marking, as shown in FIGS. 6B and 6C, have become hidden due to slow-acting ink. The codes on the counterfoil, however, to which developer was applied as described in FIG. 6C, are now revealed to the voter.

In some examples the codes revealed to the voter on the counterfoil, whether or not by delayed ink, and whether or not on a detachable member, optionally server at least a number functions: provide a handy "ballot serial number" identifier for the voter to use in looking the recorded codes up online (particularly in the case the case that the codes are not unique, as mentioned); protection against multiple voters being issued the same ballot number, provided that there is substantial probably that the they vote differently; providing authenticators that provide at least probabilistic evidence that the ballot was in fact cast and not spoilt for whatever reason; provide a means for poll-workers to remove, such as physically, such probabilistic evidence in the case the ballot is spoilt. In the case that the poll-workers remove an authenticator for a ballot that is to be audited, such as what has been called a print-audit ballot, it is preferable that only part of the authenticator is removed and even that which part is random or otherwise not under the control of the poll-worker, so as to allow the at least probabilistic audit of the full printing on the ballot forms.

Traditional "document scanning" systems (here understood to include by scanning or photographing or whatever sensing means), the scanning means and associated hardware and/or software systems generally referred to here as "image processing," look for marks and are known to make errors. For example, errors include cases where parts of a form do not scan, such as because of wrinkles, folds, tom parts, smudges, spills, misfeeds, alignment error or other reasons. Also, alignment accuracy can be an issue, such as when forms slip against rollers in scanning or move on a platen. Also, changes in paper size due to manufacturing tolerances and changes in humidity reduce the efficacy of alignment-based position recognition. Furthermore, deliberate redactions of parts of a form are also unnoticed.

The inventive system disclosed here preferably finds all what will be called "position indicators," whether marked or unmarked, before accepting the scan. This approach is believed to address the above mentioned problems. In some examples the pattern of position indicators also optionally serves as an identifier of the form type or so-called "ballot style" and/or as a registration or alignment pattern. In order to enhance protection against errors and even attempts to report incorrect scans by scanners, in some exemplary embodiments, coded patterns are printed. In those embodiments where marks hide the coded patterns, their absence provides security or at least resilience against a scanner incorrectly reporting the absence of a mark; where marks cause other codes to develop, a positive interlock between the form and the scanner is provided that can prevent the scanner from incorrectly reporting the absence or even presence of marks.

In some examples marks are not readily human-readable, such as two dimensional barcodes formed from dots and the like. If pens supplied create a substantially transparent "highlighter" type of mark, then the barcode dots are optionally in a similar color so that they would become substantially less noticeable after marking or, as another example, the color former of the marks can in effect be erased or what is referred to here as "disappear" by components in the pen ink.

Turning now to FIG. 7A-C, detailed exemplary embodiments of pre-filled positions are shown in accordance with the teachings of the invention. Shown are pre-filled ovals, as an example of a position indicator for a mark position without limitation. The "pre-fill" is pre-printed indicia, preferably unique on the form and that is accordingly recognized by scanners, such as a uniform light color that is readily recognized 12 by a color scanner. The ovals are shown unmarked in FIG. 7A and marked in FIGS. 7B and 7C, the marking in 7B and 7C illustrating different examples. FIG. 7B shows a mark for the second position as a solid obscuring blob, such as formed by a pen, pencil or marker. FIG. 7C shows a mark that interacts with the pre-fill to create a third color or other recognizable indicia, allowing the scanning system a more positive recognition that the position had been marked. One example of such interaction is a transparent color of a marker pen that interacts with the color below, as is known; another example are chemically interacting pens, such as are known as children's toys sometimes part of a "magic pen collection" made by Crayola, of Easton Pa., where one pen ink would be pre-printed and the other applied.

Referring now to FIG. 8, plan views of exemplary embodiment of pre-filled position patterns are shown in accordance with the teachings of the invention. FIG. 8 illustrates two large ovals with complex patterns that could be printed in black and white or in one or more colors.

Referring now to FIG. 9A-C, plan views of detailed exemplary embodiments of pre-filled coded position forms are shown in accordance with the teachings of the invention. The scanner preferably OCR's such marks or reads the barcodes and thus has a positive check that it has seen an unmarked position correctly. The barcode can be, for instance be: a simple fixed pattern, preferably per position; a random or pseudorandom value with or without redundancy; and/or a cryptographic authenticator. In some examples the a values are even such that they can be combined in an error correcting code to reveal a public key digital signature. For instance, each mark constitutes a signature on its own in some examples and in other examples a linear combination of marks per contest determines a signature.

In FIG. 9A the coded pre-fills, barcodes (in the example of the symbols "dfsh" and "3oidr"), are preferably printed in a color substantially the same as the marker color or that will develop to be substantially the same as the marker color, that will be well hidden by the marker color, or that will develop to be a invisible. With a so-called "2-dimensional barcode," even marks that only cover a horizontal part of the area by the voter are positively detected since the code is obscured and cannot be read.

In FIG. 9B the second position is shown marked with a substantially obscuring blob, such as might be made for example by a pen or pencil. The coded information is thus obscured from being recognized by the scanner means.

In FIG. 9C, the marking pen means includes a developer for the invisible ink that reveals a separate code, in the example a human-readable code. The barcode for "3oidr" is shown as hidden and the code "6J2" revealed. It will be understood that such a desirable result, as will be described further with reference to FIG. 10C, is readily achieved with known technology such as a combination of invisible and disappearing inks, whether for instance applied in the same locations or in alternate pixels.

Turning now to FIG. 10A-C, combination flowchart and block diagrams of exemplary embodiments of pre-filled positions and related systems are shown in accordance with the teachings of the invention. Each of the three FIGS. 10A-C illustrates an example system for a case already described with reference to FIGS. 8, 9A-B, and 9C, respectively.

Referring now to FIG. 10A, the positions on the optical scan form are printed 1001 in a way that is readily recognizable by the system as distinct from other areas on the form. The form is marked 1003 and the unmarked position are recognized 1005. The marked positions are sensed 1007 such as in the known art. Finally, the system preferably ensures that all positions on the form are accounted for 1009, either as marked 1005 or unmarked 1007.

Referring now to FIG. 10B, the positions on the optical scan form are each printed 1020 with a code that is preferably at least unpredictable to certain parts of the system. The form is marked 1022 in a way that hides the codes in those positions marked. The codes from the unmarked positions are sensed 1024 and these codes are reported 1026. Finally, the system preferably ensures that the codes reported by a part of the system in box 1026 are consistent with those know to have been printed in box 1020. Additionally, but not shown for clarity, the marked positions are optionally sensed and all positions are accounted for.

Referring now to FIG. 10C, the positions on the optical scan form are each printed 1041 with two codes preferably at least unpredictable to at least some parts of the system. A first code remains visible until the position is marked, but then becomes substantially unreadable when the position is marked; a second code is substantially unreadable until the position is marked, but then becomes substantially readable after the position is marked. When positions are marked 1043, the corresponding first code becomes unreadable and the second readable. When the form is scanned or otherwise sensed, the codes readable in each position are preferably obtained 1045 by at least a part of the system. The codes obtained in 1045 are then reported in 1047. Finally, the reported codes are preferably checked 1049 as consistent with the codes printed and the positions marked.

More generally, slow-acting ink optionally in combination with the inventive “dummy” and “real” invisible ink systems previously disclosed, provides advantages for applications beyond voting systems.

One inventive aspect uses the standard invisible ink but a slow-acting ink as the dummy ink. This allows reading of the symbols initially once the form is marked with the developer pen, as the invisible ink turns color substantially immediately; but it prevents reading later, once the dummy ink eventually turns substantially the same color or darkness as the developed invisible ink. A second inventive aspect is that the invisible ink is slow-acting and the dummy ink remains a dummy. This latter approach allows symbols to be activated by someone, such as a poll worker in the example application of elections, and yet that person or an onlooker is prevented from reading the symbols, even though another person, such as the voter, who later obtains custody of the form is able to read the symbols after a delay.

In order to keep slight development of the inks from allowing the symbols to be read too early, various masking symbols can be printed, whether static or with stunted development. As an example, the dummy ink is also a slow-acting ink preferably matched to the invisible ink during an initial time segment but the extent to which it can develop is limited; both inks start changing in a substantially indistinguishable manner for some time period and then they change in a different manner to allow later reading of the symbols. As another example, a “camouflage” or other obscuring pattern printed in muted colors or darkness makes it difficult to read the symbols when they are only partly developed but does not substantially interfere once they are substantially developed. As a further example, some printing may fade out to reveal or make the hidden symbols more readily readable. Masking patterns can be printed in conventional ink and/or using inks that change as they develop.

The speed of development of invisible inks is well known in the art. In many traditional settings, ink formulators struggle to make the speed of development high and ways that do not provide adequate speed are considered undesirable but well known. For instance, generally it occurs that dilute or otherwise weakened forms of inks develop more slowly. Also, of course, physical impediments to the mixing of the chemical agents, such as wetting time, are known to delay formation of color.

In a first embodiment, a combination of pre-applied materials, such as printed inks, in combination with post-applied materials, such as pen-based developer, results in an area that is not substantially humanly readable after the pre-applied materials are applied but that becomes humanly readable a substantially pre-determined time after the post-applied materials are applied. In one example, the first embodiment is used to pre-print form identifying information on forms supplied to persons, where the person supplying the form applies the post-applied materials but is not substantially able to read the form identifying information although the person who receives the form is later able to read it.

In a second embodiment, a combination of pre-applied materials, such as printed inks, in combination with post-applied materials, such as pen-based developer, results in an area that is not substantially humanly readable after the pre-applied materials are applied and that becomes humanly readable substantially immediately after the post-applied materials are applied but that become substantially unreadable some substantially pre-determined time after the post-applied materials are applied. In a second example for elections, the positions marked by voters are printed with the pre-applied materials and the post-applied materials are applied by voters making symbols visible to voters but where the slow-acting process later hides those symbols, such as during archiving or hand-counting.

Turning now to FIG. 11A-D, combination plan and schematic views of an exemplary fade-out invisible ink system in accordance with the teachings of the present invention are shown. FIG. 1A is an example of a single symbol when the real ink and dummy ink are applied and is substantially blank or a substantially uniform masking color to enhance the indistinguishability of the symbol foreground and background regions.

Figure 11A:
Figure 11B:
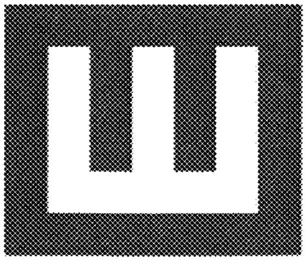
Figure 11C:
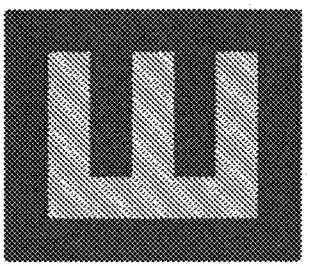
Figure 11D:
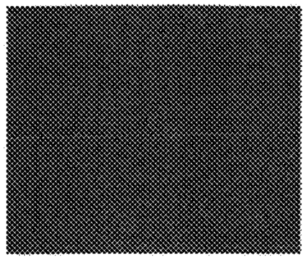
Figure 12A:
Figure 12B:
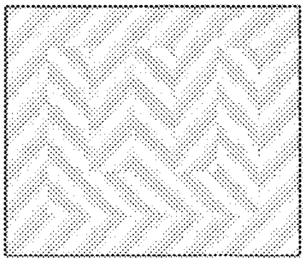
Figure 12C:
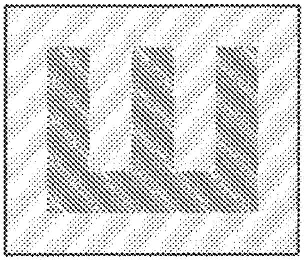
Figure 12D:
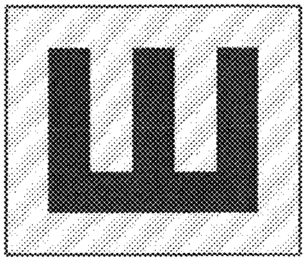

Referring to FIG. 11B, the same region of FIG. 11A is shown having been exposed to post-applied materials such as a marking pen or dauber. The letter “E” is readily visible, as the background has substantially turned black and the foreground has only turned slightly darker, still shown as white for clarity. Then in FIG. 1 IC, preferably a few minutes later according to the concentrations of the materials, the foreground can be seen to be well on the way to turning black. In FIG. 11D, after the pre-determined time interval, such as ten or fifteen minutes in some examples, the foreground and background have become substantially visually indistinguishable black.

In some examples, as described already, this effect is achieved for instance by a slow-acting ink being used for the foreground and a fast acting ink for the background. In other examples, more generally, the background moves towards the foreground as an aspect of ultimately hiding the symbols. As will be appreciated, the notion of foreground and background of a symbol and darkening images are only examples and are simplifications for clarity.

Turning now to FIG. 12A-D, an exemplary fade-in invisible ink system is shown in a combination plan and schematic view in accordance with the teachings of the invention. Again the first pane, FIG. 12A, contains the pre-applied materials but with the regions substantially indistinguishable. Then in the second frame, FIG. 12B, the two regions are each starting to develop, but remain substantially indistinguishable in this initial stage (although a slight difference is shown for clarity in the diagram). This hiding effect can, not shown for clarity, be enhanced by a seemingly random pattern of low intensity that obscures subtle differences at this level of darkness but that is overwhelmed by subsequent levels of darkness. Later, in FIG. 12C, the background region has begun changing color more slowly if at all, while the foreground is well on the way to black, allowing reading. Finally, FIG. 2D shows the foreground fully developed to black for high-readability and even archival retention in some examples. In other examples, more generally, the two regions go off in different color and/or darkness directions to ultimately reveal the symbols in visual contrast sufficient for readability.

Turning to FIG. 13A-C, combination block and flowcharts of exemplary fading invisible ink systems are shown in accordance with the teachings of the invention.

Referring specifically now to FIG. 13A, an exemplary fade-out invisible ink system application is shown. In a first step 1301, the materials are formulated, with the two inks referred to as “real” and “dummy” for convenience. In a second step 1303, the inks are applied to the paper or other substrate to unreadably record certain symbols by an example foreground and background method. (Other methods of recording and rendering symbols, such with more types of regions, are anticipated fully but not described for clarity.) Then, for each use of the forms 1305, they are provided the user in a first iterated step 1307 along with means for activating the materials, such as suitable pens or the like. This allows the users to learn the symbols, at least those that are physically exposed to view in a developed state. Then in a second iterated step 1309 the symbols on the forms become unreadable and the forms are processed further without those seeing them being able to readily determine the symbols.

Referring specifically to FIG. 13B, an exemplary fade-in invisible ink system application is shown. In a first step 1320, again the materials are formulated and in a second step 1322 they are applied to unreadably record certain symbols by an example foreground and background method. (Again, other methods of recording and rendering symbols, such with more types of regions, are anticipated fully but not described for clarity.) For each use of the forms 1324, they are provided to the user in a first iterated step 1326, but with the original materials activated by the post-applied materials, such as by a suitable pen stroke or the like. This keeps the symbols from those activating them and those observing the activation. However, in a second and subsequent iterated step 1328, the symbols on the forms become readily readable allowing the user who obtains the form substantially quickly thereafter to learn the symbols, at least those that are physically exposed to view in a developed state, once the materials develop sufficiently.

Some paper-based election systems are subject to potential manipulation because marks that could have been made by voters but were not made by them are later added to ballot forms after voters have cast them. These illicit marks can add votes or "overvote" and thereby spoil votes. Several exemplary aspects to addressing these problems are disclosed here. They can be applied separately and/or in combination. One such aspect changes how voters vote and will be described first, with reference to FIGS. 14 and 15. Another example aspect diversifies the pens to make undetected addition of marks difficult, as will be described with reference to FIGS. 16 and 17. A still further type freezes ballots after marking, as will be described with reference to FIGS. 18 and 19.

Figure 14A:
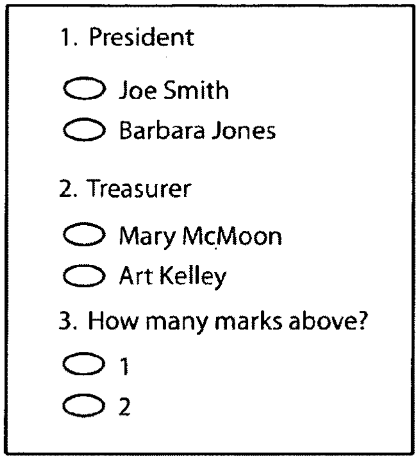

Turning now to FIG. 14A-D, plan views of exemplary embodiments of ballot forms providing mark count contests in keeping with the spirit of the invention will be described. Four examples are shown as FIGS. 14A-14D, with the second and third being unmarked and marked variants of the same form, as will be described. As will readily be appreciated, FIG. 14A shows a typical optical scan ballot form, except that the last contest, contest number three, has two options, one corresponding to the number one and the other to the number two. The voter would be instructed, not shown for clarity, to mark the number corresponding to the number of marks made on the rest of the form. That is, if the voter voted for only one of the two plurality contests, then the voter should mark the first position corresponding to a single mark; but, if the voter voted in both plurality contests, the voter should mark the second position, corresponding to two marks. Of course it will be understood that other possibilities not shown for clarity may also be included, such as that the voter "overvoted" by marking both candidates for both contests.

Figure 14C:
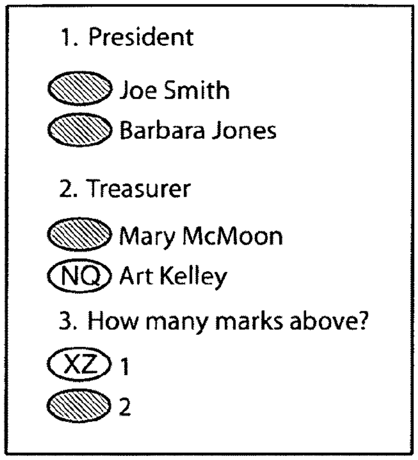
Figure 14B:
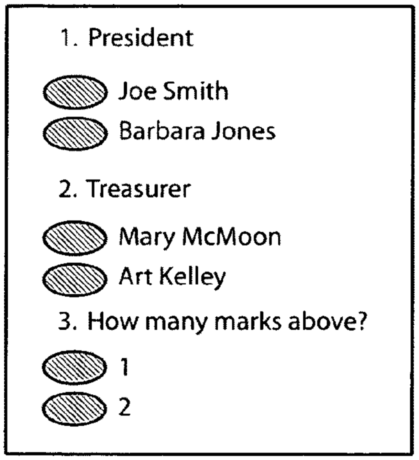

Referring now to FIGS. 14B and 14C, ovals suitable for scratch-off or invisible ink marking are shown, as described elsewhere here. The oval content is thus obscured in FIG. 14B and revealed in FIG. 14C for an example vote for a single candidate in the example and the corresponding third contest is voted with the correct mark count of one. Each oval has a code, preferably unique at least per contest. If the voter marks the mark count, a code is revealed. The voter can do this before scanning or after scanning. If the voter does not mark and the scanner reveals the code, the voter can check it by marking before casting or by spoiling the ballot, as will be described with reference to FIG. 15.

Figure 14D:
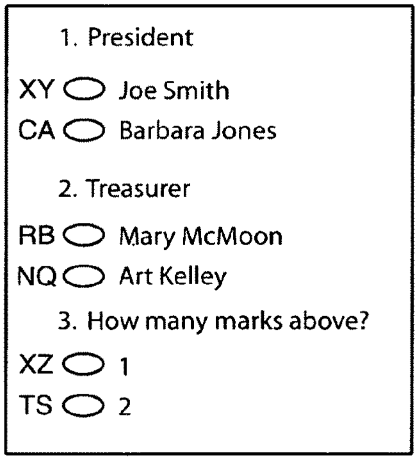

Referring now to FIG. 14D, a ballot that can be regarded as of the original Scantegrity type is shown. If the scanner were to display the code next to a mark count and a poll-worker or printer were to write it on a receipt, then the voter would have a record and could also complain if the wrong code were written. The code would, of course, not reveal how many marks the voter made.

Turning now to FIG. 15, a flowchart of an exemplary embodiment of a mark count code receipting scanner in keeping with the teachings of the invention will be described. The first step 1501 is the allowing of the voter to mark the ballot, including allowing the voter to mark the mark count contest, as has already been described with reference to FIG. 14.

When the ballot casting begins 1503, the scanning device counts the number of marks on the ballot 1505. The device also reads 1507 any mark for the mark count contest. The device then checks 1509 whether there is a discrepancy between the two values, if both are present, in which case an error condition 1511 is raised, as will be understood. If no error condition is raised, the mark code is preferably made known 1513 to the voter, for example by being displayed and/or printed. In some examples the printing is over the ballot form itself and optionally but preferably includes highlighting of the marks made by voters in a way that indicates how they are interpreted.

The voter is preferably allowed to check the ballot 1517, so that the count code can be checked if it were not marked or the code was not known to the voter. The voter may also choose 1515 to cast the ballot 1519 either without checking or in some examples, not shown for clarity, even after checking.

In paper ballot systems voters generally do not make enough marks to prevent someone from adding additional marks to the ballots, as has been mentioned. Some such what will be here called "added" marks can introduce votes for candidates or questions that the voter did not vote on, while others can cancel the validity of a vote through introducing so-called "overvotes." Related is what will be called "injection" of fraudulent ballots into a voting system, typically accompanied by what will be called "removal" of ballots to compensate for some or all of those injected.

An aspect of the present invention is directed at preventing the undetectable addition of marks or injection of ballots through what will be called "diversification" of marking devices. Generally, in some example aspects and by way of summary, pens provided for marking ballots have different components and preferably components that vary as the pen is used so as to make it difficult to add marks later without leaving at least forensic evidence. In some exemplary embodiments, "static" differences between pens preferably also make it difficult to recognize without special knowledge and/or equipment. In addition to such static diversification, markers may what will be called "dynamically" make different marks, the marks differing over time that the marker is used. Static and dynamic diversification can be combined in the same markers: marks can reveal, at least forensically, which marker was used and if the marks were made a substantially during what will be called the same marking "session."

As just one illustrative example of static diversification, pens each contain a different combination or distribution of forensic taggants. Further, voters preferably mix the pens in a container after using them so that which pen is used by which voter or ballot is not readily known.

As just one illustrative example of dynamic diversification, the ink wick reservoir of a marker pen is filled with different solutions during its filling such that as it is used the composition of the ink varies as the solutions are wicked and even potentially mix. This then results in a substantially unique combination, such as of dye and/or taggants in the ink that changes as the pen is used and becomes substantially difficult to replicate for the purpose of adding marks that are resistant to visible, automated, and/or forensic discovery. Such reservoir systems will be referred to generally here as "graded reservoir" inking systems.

When markers are even statically unique, modification of ballots without the corresponding marker becomes difficult. When there are a large number of potential taggants per marker, for instance, then even knowing the combination for a particular marker may still leave it difficult to reproduce. Moreover, not all taggants used need be revealed or known to all entities. In some examples, taggants are sparsely distributed in markers, so that the full set in a marker may not readily be determined from the marks on a ballot.

Destruction of markers can improve resistance to injection of ballots. For instance, if the collection of unique markers used in voting becomes know, such as based on serial number of markers remaining in a batch, but the markers are themselves destroyed, it may be difficult for those wishing to inject ballots to learn what the characteristics of the destroyed markers were and/or to duplicate them sufficiently well. In other examples, the set of markers used is hidden by being mixed in with a larger batch of markers.

A particularly practical example is where markers are unique and each polling place is randomly assigned a small number of markers, such as a small multiple of the number of voting booths at that polling place. The assignment to polling places is, for instance, simply by selecting a handful of markers for that polling place from a bin. Voters are to take a marker at random from a container at the polling place, vote with it, and return it to the container. The container preferably provides for mixing of pens, such as with a hopper. In one example, the last voters at the polling place each destroy or witness the destruction of their marker; alternatively, markers can be returned with ballots and accounted for but preferably mixed in a large batch to make finding particular markers more difficult. In an example variant, one organization supplies the ballots and another, the markers.

Turning now to FIG. 16, a section of a diversified marking device in accordance with the teachings of the present invention is shown. The body 1610 holds a writing tip 1630, such as a so-called "felt tip" or other porous and/or rotating ink dispensing means. Also contained in the body is the "ink" 1620, such as a liquid or a gel. Ink 1620 may be homogenous or deliberately not. In the former case, diversification is achieved by including various markers, taggants, additives, colorants, tell-tales or the like so that the marks of pens are substantially statically diversified. This is preferably accomplished in a way that leverages secrecy of the inclusions and difficulty of detection and also possible interaction of the inclusions.

The non-homogenous dispersion of ink 1620 separately or additionally provides dynamic diversification. Pens with marbled gel are known and each color of such a gel in one embodiment is instead be replaced by a covert taggant or taggant mixture. In other examples ink 1620 is delivered by capillary action through a medium and the capillary is loaded with two or more different inks, for instance one from one end and the other from the other end, so that the combination of them varies gradually as the pen is used.

Turning now to FIG. 17A-B, combination flowcharts and block diagrams of pen diversification systems are shown in accordance with the teachings of the invention. FIG. 17A is directed at a static diversification system and those of FIG. 17B include dynamic diversification, but combinations of the two are anticipated.

Referring to FIG. 17A, Box 1701 shows the provision of pens to the voters in a way that preferably allows the voters to introduce randomness by their selection of pens and in which the pens are statically diversified, which is referred to as "making subtly different marks" in the drawing for clarity. The next two boxes, 1703 and 1705, indicate instruction to voters to take actions, for completeness, but the actions by voters are not intended to be essential steps in the process. Box 1703 indicates that the voters are instructed to take the pens provided in step 1701 and use them to make marks. Box 1705 indicates that voters are to return the pens. Finally, box 1707 provides the property obtained, which is that the static diversification of the pens leads to marks that are different per pen.

Box 1720, now referring to FIG. 17B, shows the provision of pens that are at least dynamically diversified to voters. Again, box 1722 indicates instructions to voter and voter action is not itself a necessary step. The instructions are to use the pens to mark the ballots. Finally box 1724 indicates the property of dynamic diversification, which is that marks made later would show a lack of continuity and be substantially recognizable as such.

Paper ballots can be what will here be called "processed," or also here "frozen," after marking by voters so as to substantially make subsequent marks recognizable as such. Such processing or freezing will also be called "protection." One example way to freeze a marked ballot would be plastic laminating. While full front-back laminating may be undesirable in practice for various reasons, coating in limited areas with thin plastic layers may be quite practical as will be described. Another example way to freeze a ballot will be called "passivating" the underlying reactive agents in the ballot so that they will not subsequently react with marking ink at least in the usual manner. In yet another approach, a developing process alters the unmarked regions of the ballot that have not been marked already by an ink containing a fixative.

Turning now to FIG. 18, a plan view of an exemplary embodiment of a frozen ballot in accordance with the teachings of the invention is shown. A ballot 1810 is depicted with various regions, shown as stripes 1820, of a preferably transparent plastic material fused on. For example, incorporated into the scanner or as a separate device is a mechanism like a laser printer that uses a preferably clear or translucent toner to preferably print stripes on the ballot form. It has been verified that such stripes are difficult to remove and are not very receptive to inks or invisible ink developer. Thus, marks made before coating will be protected under the coating and those made after will be protected from the paper by the coating. Moreover, the active areas are believed passivated to prevent later marking. When an audit step is conducted, ballot marks are preferably selectively inspected and marks made after coating are revealed as improper. In other examples the regions 1820 may be aimed primarily at passivating underlying reactive areas.

Turning now to FIG. 19A-B, combination flowcharts and block diagrams of exemplary embodiments of freezing against undetectable post casting marking in keeping with the teachings of the invention will be described. Two examples, FIGS. 19A and 19B, are included: the former with a coating over the marked ballot and the latter passivating active regions, as will be described.

Referring now to FIG. 19A, box 1901 shows the opening of the polls, box 1903 the voter being allowed to mark the ballot, and 1905 the voter being allowed to cast the ballot. Preferably directly after casting the ballot receives at least a partial coating 1907, such as has been illustrated with reference to FIG. 18, as already described. When auditing 1909 is optionally initiated, ballots are inspected 1911 to detect marks that were made after coating, such as marks where the coating was tampered with in order to insert marks below it.

Referring now to FIG. 19B, box 1920 shows the opening of the polls, box 1922 the voter being allowed to mark the ballot with ink containing a fixative, and 1924 the voter being allowed to cast the ballot. Preferably directly after casting, the ballot receives development 1926, such as by the heat of a thermal printer (or by UV light as is known). Incorporated into the pen ink are chemicals or other means that act as a fixative to prevent the marked regions from developing. Thus, marks made before coating will be protected from developing and so will be apparently undeveloped, while those made after will be on areas of the paper that have developed. Another approach, different from that depicted but as will readily be understood from the depicted version is where the active color-changing elements in the ink are passivated by the "development" 1926 and then are not readily activated by subsequent application of a marker. When an audit step 1928 is conducted, ballot marks are preferably selectively inspected 1930 and marks made after development are revealed as improper.

Turning now to FIG. 20, a combination block diagram and flowchart of an exemplary embodiment of an audit choice commit system in keeping with the spirit of the invention will be described. When voters are able to request the full "opening" a commit that would reveal how they voted, there is a danger that they would be caused to do this under a signal from someone who is attempting to influence their vote improperly and would obtain access in to what is in effect a spot check on the vote. For example, the voter might receive a pager alert, phone call, text message or might hear a certain sound or word uttered in the polling place and would then the request to leave the booth and scan the ballot they have been marking while requesting it to be audited. The resulting receipt or process would then allow others to verify how they had voted.

One exemplary inventive approach to preventing such a threat includes, in the first step after the voting session begins, such as when the ballot is issued to the voter, the voter making a commitment as to whether they will cast or audit. This commitment should not be readily known to other than the voter (as it could be used to moot efficacy of the audit) yet it is preferable that the time that the commit is made, and that it is not modified until it is supposed to be opened, is readily verifiable by those in the polling place. In one example, the commit is made when the voter enters the booth and placed outside or above the booth so that it is readily visible; the choice committed to is preferably hidden, such as in a box or envelope or otherwise. This is indicated in the manual operation box 2003, shown after the beginning of voting 2001.

Once the commit is made, the voter is able to mark the ballot in the booth 2005 and then the ballot is read or scanned 2007. (In the case of a so-called DRE these two steps, 2005 and 2007, are combined into the voter entering the vote selections into the DRE machine.) In some embodiments, the voting system commits 2009 to the receipt, such as by printing under glass, that may later be revealed to the voter in step 2017. At this point the voter commit is opened 2011. One of the alternative paths shown as choice 2013 is that the value committed to is "audit" and then the details are opened to the voter 2015 including revealing the vote; if the choices is "vote," then the ballot is cast 2017. The voting session then ends 2019.

Turning now to FIG. 21A-B, combination section and schematic views of exemplary embodiments of indelible marking buttons in keeping with the teachings of the invention will be described. Each of the two buttons 2110*a* and 2110*b* is shown in a different configuration: the one on the left 2110*a* in the un-pressed state and that on the right 2110*b* in the pressed state. The urging means, shown for clarity as helical springs 2120, urge the buttons 2110*a-b* into the un-pressed state, as will be understood. The buttons 2110*a-b* move axially through guide means 2130*a-b*. The punch end 2150 of the mechanical linkage 2140*a-b* marks the paper 2160 by penetrating through it. Also, the switches 2170*a-b* are shown as activated when the punch 2150 marks the paper 2160.

Anticipated is whatever substantially transparent means for marking the paper substantially permanently here "indelibly" as selected by the voter and for providing indication to the equipment of the voter choice.

Referring now specifically to FIG. 21B, a printer 2180 is shown with portions of the paper receipt 2160 that has been printed protected by a substantially transparent cover means 2190. Two buttons 2110 of the type already described with reference to FIG. 21A are shown configured to punch into different positions across the printed web. In one example, the buttons indicate whether the voter wishes a random input of "L" or "R," as will be described. In another example, the buttons 2110 indicate whether the voter wishes to cast or to audit a ballot. Other examples will be understood, such as three buttons, one for each of cast, audit, and return the ballot.

Turning now to FIG. 22, a flowchart of an exemplary embodiment of unpredictable ballot differentiation in keeping with the teachings of the invention will be described. The voter choice segment shown is preferably inserted in the overall flow during scanning and before casting. In other examples that include audit, it preferably precedes audit. The beginning and end of the segment are shown as entry points 2201 and 2275, respectively. The voter makes a choice 2203 between two buttons, for example, one called "L" (for instance on the left) and the other "R" (on the right). The buttons, as already described with reference to FIG. 21, mark the form in a corresponding distinguishable way. Button "L" for instance marks one way 2205 and button R 2251 marks the other. Also, the sensor means 2170 communicate the choice made to the mechanism, where it is obtained, as indicated by boxes 2207 and 2253. If an encrypted receipt is printed, as is preferred, as shown in boxes 2209 and 2255, then it preferably includes the respective choice. As will be understood, if the printing is inconsistent with the indelible mark made by the buttons, the receipt is a kind of evidence of improper behavior of the mechanism.

One example use of such a mechanism is for making identically printed ballots that are voted the same way have a substantial chance of having a different "L" or "R" choice, which is interpreted as an extra contest without consequence that is adequate to distinguish instances of identically-printed ballots. Another example use of such a mechanism is to input a choice of whether the ballot is to be cast or audited, as already mentioned. Without such indelible marking of the choice, the mechanism might get away with cheating by ignoring the voter choice and taking another choice that allows it to avoid detection as having printed an improper receipt. More than two-way choices and more than one choice instance allow more than two alternatives, as will be understood.

End to end voting systems, such as Punchscan and Scantegrity disclosed by the present applicant, are substantially aimed at allowing legitimate voters to ensure that their votes are in fact counted. Addressing the threat sometimes referred to as "ballot box stuffing" is aimed at preventing counting of votes not from legitimate voters, which is also believed substantially important in ensuring election integrity.

Known techniques for preventing stuffing include the use of so-called "poll books" in which voters sign for their ballots next to a pre-printed copy of their name and address. In other examples, a sign-in sheet is used on which voters each fill the next blank line with their signature and other information. So-called "automated poll-books" are typically computers that election workers use to look up voters and ensure that they have not yet voted at the present or in some cases other polling places. Some of these include printing a slip for voters to sign. Also, some voting machines have contained a so-called "public counter," which mechanically counts in public view each ballot cast.

Shortcomings of such systems include the reliance on those at the polling place to ensure that votes are not cast for voters who are not present. For instance, stuffing can occur around the close of polls, once it is known that certain voters did not appear and poll-book entries can then safely be made on their behalf. In other examples, ballots are cast before the opening of polls for voters known not able to attend. The first voters to arrive or the last to leave may raise an alarm about such stuffing by those in control of the polling place, although such early or late voters are typically not trained and generally unable to obtain compelling evidence. Without compelling evidence, ambiguity and corresponding lack of accountability is introduced as to whether stuffing has been conducted at the polling place, during transport, or centrally. It would be desirable to ensure that a "public counter" like function of the polling place more generally is in fact viewable by the general public and not just those in attendance at particular times.

The present invention includes among its objects addressing the above shortcomings and providing practical, efficient, secure, and economical articles and systems to do so.

In brief summary, in a simplified example without limitation, the invention includes a form that contains pairs of codes associated with each of a series of positions. The codes are preferably printed in so-called "scratch off" and/or the ink systems described earlier with reference to FIGS. 5 and 12. A pair is assigned to a voter preferably substantially at the time the ballot is issued to the voter, such as by the voter or a poll worker choosing the next position on a list of such positions. The voter is preferably able to at least influence the selection of which code is to be revealed, preferably by a random selection, or by voter choice. The code is revealed by the development of the invisible ink, such as by swiping a suitable pen or dauber over it, as has been described, or by scratching off or otherwise removing a protective coating or covering. The voter is preferably able to record the code so revealed, such as by writing it down, dictating it, or remembering it. In one example system, the poll workers are to upload in real time to an automated system an indication of the code released. Voters are preferably able to check online to see whether the code they have recorded has been posted and/or to provide it for posting. The timing of the posting of the codes, if in real time, is believed to substantially provide in effect a real-time public counter online.

As will be appreciated, it is believed that an attack that attempts to publish codes in advance of the choice by voters runs the risk of incriminating itself by posting the member of the pair that ultimately is not selected by the voter. Similarly, an attack that delays posting of codes is subject to detection by the codes being made available online by voters before they are officially posted. Accordingly, online posting of positions on the forms is believed to verifiably track physical filling of the form and thus provide a substantially real-time public counter.

In some examples the form is filled to include a voter signature and/or other voter information per position. In other examples, a position on the form refers to an entry in a poll book. For instance, a line-number or a sticker from a corresponding entry in a manual poll book is transferred to the position on the form.

The codes printed are preferably committed to in advance of the election in a way that can preferably be verified by opening them as they are used or at least afterwards. For example, each code occurs encrypted in a corresponding position in a table that is published and the corresponding keys are revealed as each code is revealed.

Turning now to FIG. 23A-B, exemplary embodiments of scratch-off paired check-in forms in accordance with the teachings of the present invention are shown. FIG. 23A shows the form unfilled; FIG. 23B the form partly filled. Next to each position, of which only three are shown in the example for clarity, there are two exemplary scratch-off regions, shown as black approximate ovals. The dotted lines are for the voter signatures, provisions for other information, such as name and/or address, not being shown for clarity. The positions are numbered; however, unnumbered forms and/or partially numbered forms are also anticipated.

Referring now to FIG. 23B, the form of FIG. 23A is shown at a later stage with two voters having signed their names. Each voter has preferably chosen one of the ovals to scratch-off, and the corresponding codes have been revealed and optionally recorded by voters. The first voter, for instance, has signed on line one and chosen the oval on the left to open, revealing the code 5RJ. The second voter obtained the second code 9P8.

Turning now to FIG. 24A-B, exemplary embodiment of invisible-ink paired check-in forms in accordance with the teachings of the present invention are shown. FIG. 24A shows the form unfilled; FIG. 24B shows it partly filled. In place of the scratch-off ovals described already with reference to FIG. 23, the present figure shows printed ovals that contain indicia in invisible ink, such as already described with reference to FIGS. 5 and 12, as mentioned. Thus, in the blank form of FIG. 24A the ovals are shown empty; but in the partly-filled form of FIG. 24B, the ovals selected are shown with pen marks over them and the code indicia 3X7Q and R3Q2, respectively, developed within.

Referring now to FIG. 25A-B, combination block-diagram and flowcharts of exemplary embodiments of a voter-verifiable counter system in accordance with the teachings of the present invention are shown. Referring to FIG. 25A, the codes are created 2501, encrypted 2503, and posted 2505. In some examples the codes are created at random; in others, they are created pseudorandomly, such as cryptographically from a key. Similarly, the keys used to encrypt each are in some examples random and in others pseudorandom, as would be understood. Whatever arrangement to make the codes substantially difficult to guess and substantially verifiably committed to would be suitable. The posting 2505 preferably makes the commitments to the codes public.

Referring finally now to FIG. 25B, the use of a form in a voter-verifiable counter system is shown in a combination block-diagram and flowchart in accordance with the teachings of the present invention. For each voter, the three steps shown are repeated, according to repeat block 2520. The voter fills the next position on the form 2522, or the position on the form is filled for the voter. Preferably the positions are at least partly numbered as described and are filled in order. Next, the choice between the plural hidden codes, two in the example, is preferably provided to the voter 2524. In other examples it is formed at random by a physical experiment, such as the flipping of a coin. However it is determined, the voter preferably has some influence on the choice. In a scratch-off type system, the region chosen has its protective coating removed; in an invisible-ink type of system, the ink activator is applied to the selected region. Finally, the decrypted or opened code is published 2526.

All manner of variations, modifications, equivalents, substitutions, simplifications, extensions, and so forth can readily be conceived relative to the present inventions by those of ordinary skill in the art. One example, as will be appreciated, is where ballots are mailed out to voters and returned by voters. Another example is where ballots are considered provisional, including optionally vote-by-mail ballots, and affidavits in effect point to or determine the particular recorded codes corresponding to the votes so that the votes can then be selectively included or excluded from one or more tallies.

While these descriptions of the present invention have been given as examples, it will be appreciated by those of ordinary skill in the art that various modifications, alternate configurations and equivalents may be employed without departing from the spirit and scope of the present invention.

What is claimed is:

1. A method for conducting an election including the steps of:

(a) making public cryptographic commitments to plural codes to form committed codes;

(b) producing physical ballots including the committed codes in a hidden form, each code associated with a ballot position, the physical ballots allowing at least one voter to select at least one position on the voter's ballot such that the hidden codes corresponding only to the selected positions are revealed to the voter; and (c) making public, after the election, the hidden codes corresponding to positions selected by voters;

(d) providing voters an opportunity to provide purported codes that were revealed on ballots; and (e) opening at least some commitments at least corresponding to corresponding contests in at least a case of voters providing codes purported to have been revealed on ballots that were not made public after the election as codes corresponding to positions selected by voters;

wherein the codes are chosen so that voters are unable with substantial probability to guess codes not revealed and so that the revealing of codes provided by voters provides statistical evidence of the published codes being incorrect.

2. The method of claim 1, further comprising conducting a cryptographic protocol to establish consistency of a tally with the public codes and cryptographic commitments made in advance of the election.

* * * * *